US012687605B2

(12) United States Patent
Sanji et al.

(10) Patent No.: US 12,687,605 B2
(45) Date of Patent: Jul. 21, 2026

(54) POSITION DETERMINATION SYSTEM AND POSITION DETERMINATION METHOD

(71) Applicant: DENSO CORPORATION, Kariya-city (JP)

(72) Inventors: Kenichiro Sanji, Kariya-city (JP); Yohei Nakakura, Kariya-city (JP); Takashi Saiki, Kariya-city (JP); Yasuhiro Tanaka, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 18/631,520

(22) Filed: Apr. 10, 2024

(65) Prior Publication Data

US 2024/0255605 A1 Aug. 1, 2024

Related U.S. Application Data

(63) Continuation of application No. PCT/JP2022/037753, filed on Oct. 10, 2022.

(30) Foreign Application Priority Data

Oct. 13, 2021 (JP) ................................. 2021-168160

(51) Int. Cl.
*G01S 5/02* (2010.01)
*G01S 5/00* (2006.01)

(52) U.S. Cl.
CPC ............ *G01S 5/0295* (2020.05); *G01S 5/012* (2020.05); *G01S 5/0244* (2020.05)

(58) Field of Classification Search
CPC .......... G01S 5/0295; G01S 5/02; G01S 5/012; G01S 5/0244; G01S 13/74; B60R 25/24; E05B 49/00
See application file for complete search history.

(56) References Cited

U.S. PATENT DOCUMENTS

2019/0375372 A1 12/2019 Sanji et al.
2020/0001822 A1 1/2020 Han et al.
(Continued)

FOREIGN PATENT DOCUMENTS

EP 2492876 A2 8/2012
JP 5438048 B2 3/2014
(Continued)

OTHER PUBLICATIONS

U.S. Appl. No. 18/631,272, filed Apr. 10, 2024, Sanji et al.

*Primary Examiner* — Muhammad N Edun
(74) *Attorney, Agent, or Firm* — Harness, Dickey & Pierce, PLC

(57) ABSTRACT

A position determination system includes a microcomputer configured to: control operations of multiple outdoor units and an indoor unit; determine whether a portable device is present inside a vehicle interior or in an outdoor operation area; acquire a reception strength of a signal from the portable device in each indoor and outdoor units, acquire a time of flight (ToF) correlation value as a parameter different from the reception strength, change a type of the parameter used for position determination corresponding to an area for which the position determination is to be performed; determine whether the portable device is present inside the vehicle interior based on the reception strength observed in each outdoor unit and indoor unit, determine whether the portable device is present in the outdoor operation area based on the ToF correlation value.

16 Claims, 16 Drawing Sheets

(56) References Cited

U.S. PATENT DOCUMENTS

| 2020/0233072 A1 | 7/2020 | Osai et al. | |
| 2020/0395975 A1 | 12/2020 | Kimura | |
| 2021/0016743 A1* | 1/2021 | Kusumoto | E05B 81/78 |
| 2021/0127233 A1* | 4/2021 | Santavicca | B60R 25/245 |
| 2021/0168563 A1* | 6/2021 | Sanji | E05B 49/00 |
| 2021/0181294 A1 | 6/2021 | Kusumoto et al. | |
| 2024/0005296 A1* | 1/2024 | Stankoulov | G06Q 20/3224 |

FOREIGN PATENT DOCUMENTS

| JP | 2018141771 A | 9/2018 |
| JP | 2019073960 A | 5/2019 |
| JP | 2019158765 A | 9/2019 |
| JP | 202026998 A | 2/2020 |
| JP | 2020085487 A | 6/2020 |
| JP | 2020201181 A | 12/2020 |
| WO | WO-2019198331 A1 | 10/2019 |
| WO | WO-2020031550 A1 | 2/2020 |

* cited by examiner

○ :BLE COMMUNICATION DEVICE
   (OUTSIDE VEHICLE INTERIOR)
◑ :BLE COMMUNICATION DEVICE
   (INSIDE VEHICLE INTERIOR)

○ :BLE COMMUNICATION DEVICE (OUTSIDE VEHICLE INTERIOR)

◎ :BLE COMMUNICATION DEVICE (INSIDE VEHICLE INTERIOR)

◇ :LF TRANSMISSION DEVICE

○ :BLE COMMUNICATION DEVICE          ◇ :LF TRANSMISSION DEVICE

△ :UWB COMMUNICATION DEVICE          ▲ :UWB COMMUNICATION DEVICE
  (OUTSIDE VEHICLE INTERIOR)            (INSIDE VEHICLE INTERIOR)

POSITION DETERMINATION SYSTEM AND POSITION DETERMINATION METHOD

CROSS REFERENCE TO RELATED APPLICATIONS

The present application is a continuation application of International Patent Application No. PCT/JP2022/037753 filed on Oct. 10, 2022, which designated the U.S. and claims the benefit of priority from Japanese Patent Application No. 2021-168160 filed on Oct. 13, 2021. The entire disclosures of all of the above applications are incorporated herein by reference.

TECHNICAL FIELD

The present disclosure relates to a position determination system that is a system mounted on a vehicle for use and estimates a relative position of a portable device with respect to the vehicle based on a reception situation of a wireless signal transmitted from the portable device carried by a user and a position determination method.

BACKGROUND

There has been known a position determination system that estimates a position of a portable device by using an on-board device to perform wireless communication with the portable device.

SUMMARY

A position determination system includes a microcomputer configured to: control operations of multiple outdoor units and an indoor unit; determine whether a portable device is present inside a vehicle interior or in an outdoor operation area; acquire a reception strength of a signal from the portable device in each indoor and outdoor units, acquire a time of flight (ToF) correlation value as a parameter different from the reception strength, change a type of the parameter used for position determination corresponding to an area for which the position determination is to be performed; determine whether the portable device is present inside the vehicle interior based on the reception strength observed in each outdoor unit and indoor unit, determine whether the portable device is present in the outdoor operation area based on the ToF correlation value.

BRIEF DESCRIPTION OF DRAWINGS

Objects, features and advantages of the present disclosure will become apparent from the following detailed description made with reference to the accompanying drawings.

FIG. 14 is a drawing illustrating a modification of a mounting pattern of the BLE communication device.

DETAILED DESCRIPTION

Figure 1:
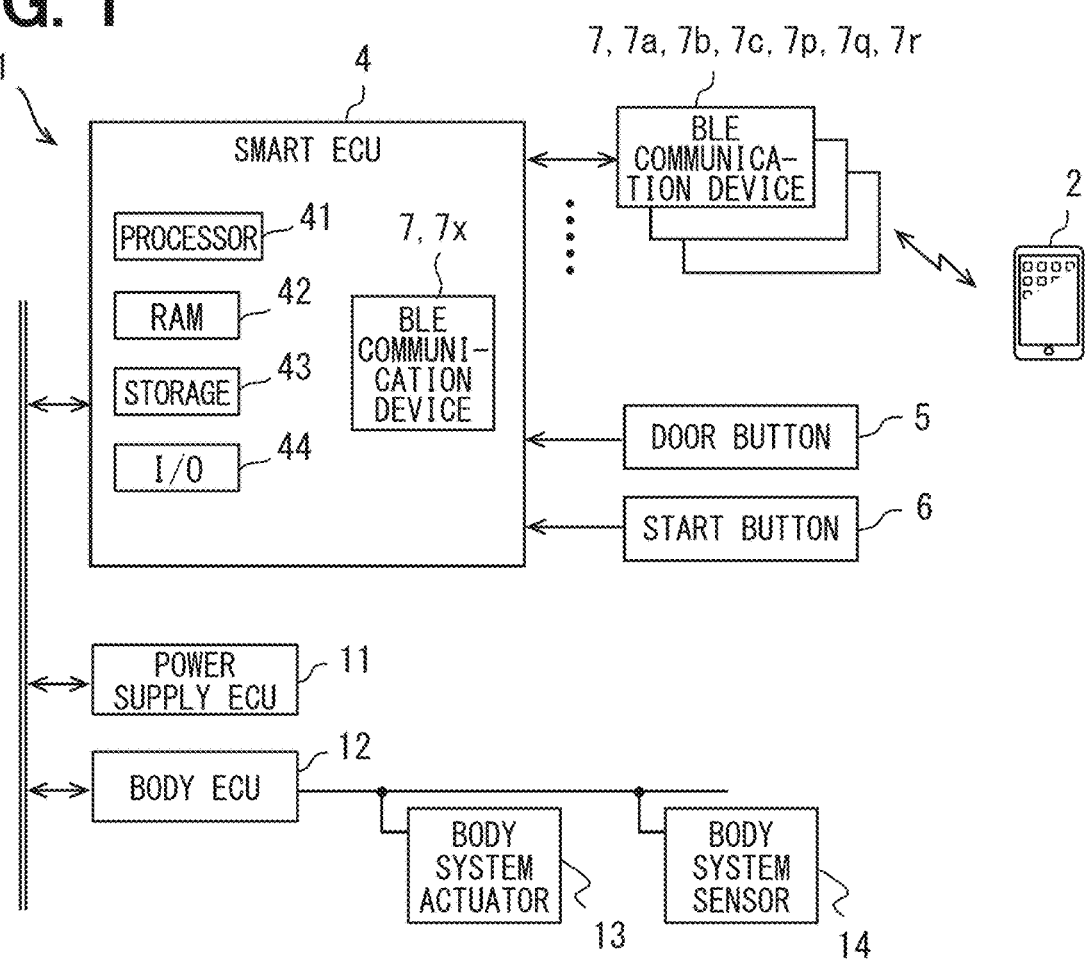
FIG. 1 is a block diagram illustrating a whole image of a vehicle electronic key system.

Before describing embodiments of the present disclosure, a known art will be described. As a subsystem to achieve a vehicle electronic key system that unlocks of a door or the like according to a position of a portable device carried by a user, there is provided a position determination system that estimates the position of the portable device by an on-board device performing wireless communication with the portable device. For example, a related art discloses a configuration in which a portable device is determined to be present in a lock/unlock area based on a fact that an on-board device is able to perform wireless communication with the portable device using a radio wave in a low frequency (LF) band. The lock/unlock area is an area where the portable device allows automatically unlocking a door by wireless communication with the portable device and is a region within a predetermined distance from the door in outside a vehicle interior.

Generally, in the vehicle electronic key system, from the aspect of anti-theft or the like, when the user is away from the vehicle at a constant distance (for example, 2 m) or more, there may be a case where a fact that the door is not automatically unlocked by the wireless communication with the portable device is required as a system requirement. The above-described lock/unlock area is often set as a region within 2 m from the vehicle, such as within 1 m from the door, from the aspect of security described above.

In the most vehicle electronic key systems/position determination systems, the reason that the radio wave in the LF band is used for signal transmission from the vehicle to the portable device is that an arrival range of a wireless signal is easily limited to be in the vicinity of the vehicle. In the vehicle, transmission electric power or the like of an antenna to transmit the radio wave in the LF band is adjusted such that the wireless signal arrives only at the lock/unlock area.

Recently, a demand for causing a portable information processing terminal, such as a smartphone and a wearable device, to function as a key for a vehicle has been increasing. In association with the demand, instead of the radio wave in the LF band, a configuration that allows determining the position of the portable device with respect to the vehicle using a reception strength at a high-frequency radio wave used for short-range communication, such as Bluetooth (registered trademark), has been demanded.

Another related art discloses a configuration that determines whether a portable device is present in a vicinity of a door that is outdoor, that is, a lock/unlock area, based on a reception strength of a signal compliant to a predetermined short-range wireless communication standard emitted from the portable device, such as a smartphone, by an authentication device. The short-range communication here means communication compliant to the predetermined wireless communication standard in which the communication range becomes, for example, around tens of meters, such as Bluetooth and Wi-Fi (registered trademark).

Other related arts disclose various configurations to estimate a position of a portable device with high accuracy. The descriptions in these related arts can be incorporated by reference as description of technical elements in this specification.

For the short-range communication, such as Bluetooth Low Energy (BLE), for example, a radio wave at 900 MHz or more, such as 2.4 GHz and 920 MHz (hereinafter, a high-frequency radio wave), is used. The high-frequency radio wave has straightness stronger than that of the radio wave in the LF band and has a property of easily reflected by a metal body, such as a body of a vehicle. The high-frequency radio wave has a degree of attenuation of signal strength due to propagation distance smaller than that of the radio wave in the LF band. The high-frequency radio wave is easily attenuated by a human body. Therefore, it is realistically difficult to accurately determine whether the portable device is present in an outdoor operation area using a reception strength of a high-frequency signal emitted from the portable device as information for making a decision. The outdoor operation area here means an area where some vehicle controls can be performed outside a vehicle interior, for example, the lock/unlock area. A non-operation area means a region positioned outside the outdoor operation area.

Between the inside of the vehicle interior and the outside of the vehicle interior, an element of inhibiting the propagation of the radio wave, such as the body of the vehicle, is present. Accordingly, according to whether the portable device is present inside the vehicle interior or present outside the vehicle interior, a reception strength in an on-board communication device of a signal transmitted from the portable device may generate a significant difference. Therefore, whether the portable device is present inside the vehicle interior can be determined with some extent of accuracy also by the reception strength.

However, a structure, such as the body of the vehicle, is absent between the outdoor operation area and the non-operation area. Therefore, in the configuration disclosed in the above-described related art, it is difficult to actually determine whether the portable device is present in the outdoor operation area or present in the non-operation area, with in an area outside the vehicle interior.

According to an aspect of the present disclosure, a position determination system for a vehicle is provided. The position determination system performs wireless communication with a portable device carried by a user of the vehicle to determine a position of the portable device with respect to the vehicle. The position determination system includes: multiple outdoor units each of which is configured by a communication device that allow the wireless communication with the portable device, each of the multiple outdoor units being installed at a position on an outer surface portion of the vehicle different from one another; at least one indoor unit configured by a communication device installed inside a vehicle interior of the vehicle; a communication control unit controlling operations of the multiple outdoor units and the at least one indoor unit; and a position estimation unit determining whether the portable device is present inside the vehicle interior and whether the portable device is present in an outdoor operation area, the outdoor operation area being defined as an area outside the vehicle interior within a predetermined distance from the vehicle. The communication control unit: acquires a reception strength of a signal from the portable device in each of the communication devices; and acquires a time of flight (ToF) correlation value as a parameter different from the reception strength, the ToF correlation value directly or indirectly indicating time of flight of a radio wave from at least one of the multiple outdoor units to the portable device. The position estimation unit changes a type of the parameter used for position determination corresponding to an area for which the position determination is to be performed, determines whether the portable device is present inside the vehicle interior based on the reception strength observed in each of the multiple outdoor units and the reception strength observed in the at least one indoor unit, and determines whether the portable device is present in the outdoor operation area based on the ToF correlation value.

According to another aspect of the present disclosure, a position determination method is executed by at least one processor to determine a position of a portable device carried by a user of a vehicle. The position determination method includes: acquiring, from each of multiple outdoor units, data indicating a reception strength of a signal transmitted from the portable device, the multiple outdoor units being disposed at respective different positions on an outer surface portion of the vehicle, each of the multiple outdoor units being configured by a communication device that performs a wireless communication with the portable device; acquiring, from at least one indoor unit, data indicating the reception strength of the signal transmitted from the portable device, the at least one indoor unit being configured by a communication device disposed inside a vehicle interior of the vehicle; determining whether the portable device is present inside the vehicle interior based on the reception strength observed in each of the multiple outdoor units and the reception strength observed in the at least one indoor unit; acquiring a time of flight (ToF) correlation value as a parameter different from the reception strength, the ToF correlation value directly or indirectly indicating time of flight of a radio wave from at least one of the multiple outdoor units to the portable device; changing a type of the parameter used for position determination corresponding to an area for which the position determination is to be performed; and determining whether the portable device is present in an outdoor operation area based on the ToF correlation value, the outdoor operation area being defined as an area outside the vehicle interior within a predetermined distance from the vehicle.

In the above position determination system/position determination method, by the determination whether the portable device is present indoor and the determination whether the portable device is present in the lock/unlock area that is an outdoor area, a physical parameter used for the determination process is changed. That is, while the reception strength is used for the determination whether the portable device is present indoor, the ToF correlation value that directly or indirectly shows the time of flight of the wireless signal from the communication device to the portable device is used for the determination whether the portable device is present in the lock/unlock area that is outdoor area.

Since the time of flight of the wireless signal is proportionate to the distance from the communication device to the portable device, the ToF correlation value directly or indirectly shows the distance from the communication device to the portable device. The ToF correlation value is less likely to be affected by a human body, and a value according to the distance from the device can be expected compared with the reception strength. Accordingly, the configuration allows the determination accuracy whether the portable device is present in the outdoor operation area to be higher than that of the configuration that performs the determination by the strength of the reception strength. That is, based on the signal emitted from the portable device, the position of the portable device can be further accurately determined.

The following describes an example of an embodiment of a vehicle electronic key system according to the present disclosure with reference to the drawings. FIG. 1 is a diagram illustrating an example of a schematic configuration of the vehicle electronic key system. As illustrated in FIG. 1, the vehicle electronic key system includes an on-board system 1 and a portable device 2. The on-board system 1 is a system mounted on a vehicle Hv. The portable device 2 is a device carried by a user of the vehicle Hv. A plurality of portable devices 2 may be present. The vehicle electronic key system is equivalent to a position determination system.

INTRODUCTION

The vehicle Hv in the following description is a vehicle possessed by an individual as one example. Therefore, the user of the vehicle Hv means a possessor (an owner) and a family member thereof. Obviously, the vehicle Hv may be a company car held by a company organization and an official car held by a public institution. In a case where the vehicle Hv is a company car or an official car, a person who belongs to an organization managing the vehicle Hv may be a user. The vehicle Hv may be a vehicle provided for lending service (what is called a rental car) or a vehicle provided for car sharing service (what is called a shared car). The vehicle Hv may be a vehicle provided for passenger transport service, such as a robot taxi. When the vehicle Hv is a vehicle provided for the services (hereinafter a service vehicle), a person who performs usage subscription of the services and has an authority to temporarily use the vehicle Hv based on reservation of the service and the like may be a user.

In this embodiment, as one example, the vehicle Hv is an engine car. The vehicle Hv may be an electric car, such as a hybrid vehicle and an electric vehicle. The engine car here means a vehicle that includes only an engine as a power source and the hybrid vehicle means a vehicle that includes an engine and a motor as power sources. The engine car also includes a diesel vehicle. The electric vehicle means a vehicle that includes only a motor as a driving source. As one example, while the vehicle Hv is a vehicle that includes a driver's seat at a right side, the vehicle Hv may be a vehicle that includes a driver's seat at a left side. Respective directions of front, rear, right, left, up, and down in the following description are specified with reference to the vehicle Hv. The front-rear direction is equivalent to a longitudinal direction of the vehicle Hv. The right-left direction is equivalent to a width direction of the vehicle Hv. The up-down direction is equivalent to a height direction of the vehicle Hv. The present disclosure can be mounted on, not limited to a four-wheeled vehicle, but various vehicles that can travel on a road, such as a trailer, a two-wheeled vehicle, and a three-wheeled vehicle. The two-wheeled vehicle can include a motorized bicycle.

Overall Overview

Both of the on-board system 1 and the portable device 2 can be configured to perform short-range communication. The short-range communication here means communications compliant to a predetermined short-range wireless communication standard in which a practical communicable distance is, for example, from 5 m to 30 m and around 100 m at the maximum. As the standard of short-range communication here, for example, Bluetooth Low Energy (BLE), Wi-Fi (registered trademark), and ZigBee (registered trademark) can be employed. As the method of short-range communication, an ultra wide band-impulse radio (UWB-IR) method can be employed.

This embodiment describes an operation of each unit with an example of a case where each of the on-board system 1 and the portable device 2 can be configured to perform wireless communication compliant to a BLE standard (hereinafter, BLE communication). Details of a communication method regarding communication connection, cryptographic communication, and the like are performed by a sequence specified in the BLE standard.

The following describes a case where settings are performed such that a BLE communication device 7 mounted on the vehicle Hv behaves as a master in communication with the portable device 2 and the portable device 2 behaves as a slave. The slave in the BLE communication is a device that intermittently transmits an advertising signal and transmits and receives data based on a request from the master. The slave is also referred to as a peripheral. The master is a device that controls a communication connection state and a communication timing with the slave. The master is also referred to as a central. As another aspect, the portable device 2 may be set so as to operate as the master in the communication with the on-board system 1.

The advertising signal is a signal to notify (namely, advertise) another device of presence of itself. The advertising signal can be referred to as an advertising frame or an advertising packet. The signal transmitted/received in the BLE, such as the advertising signal, includes transmission source information. The transmission source information, for example, is unique identification information (hereinafter a device ID) assigned for the portable device 2. As the device ID, for example, a device address and a Universally Unique Identifier (UUID) can be employed. The device address in Bluetooth may be expressed by 48 bits. UUID may be expressed by 128 bits. The device address may be a fixed public address or may be a random address. The public address is equivalent to a Media Access Control (MAC) address in Ethernet (registered trademark).

The portable device 2 is a device that holds key information to use the vehicle Hv and functions as an electronic key of the vehicle Hv using the key information. The key information here is data used for an authentication process described later. The key information is data for proving that a person who attempts to access the vehicle Hv is a user, that is, validity of a person who attempts to access the vehicle Hv. The key information can be referred to as an authentication key, a cryptographic key, and a key code. The key information, for example, can be a character string (a value) generated by entering a password set by the user to a predetermined hash function and performing encryption. The key information may be generated based on the device ID.

The key information may differ depending on each portable device 2. In the on-board system 1, the key information for each of the portable device 2 is made to correspond to the device ID and stored and registered. A plurality of the portable devices 2 may be discriminated with a key ID assigned in the order of registration instead of the device ID. While the device ID is expressed by a length around 48 bits (6 bytes)/128 bits (16 bytes), the key ID may be expressed by several bytes, such as 1 byte. The key information itself may be expressed by a bit string having a length of 8 bits or more. The longer the key information is, the more the security is firm, which is preferable. The key information may be, for example, expressed by 16 bytes or 27 bytes. A configuration with the key information of 27 bytes or less allows transmitting all key information in one packet in cryptographic communication.

The on-board system 1 performs the automatic authentication process with the portable device 2 by wireless communication. With a condition of successful authentication, the on-board system 1 achieves a passive entry passive start system that performs vehicle control according to the position of the user with respect to the vehicle Hv. The vehicle control here is, for example, lock/unlock of a door, on/off of a power supply, and engine start.

For example, when the on-board system 1 can confirm that the portable device 2 is present inside a lock/unlock area Lx preliminarily set to the vehicle Hv, the on-board system 1 performs control, such as lock and unlock of the door, based on a user operation on a door button 5 described later. When the on-board system 1 can confirm that the portable device 2 is present inside the vehicle interior by wireless communication with the portable device 2, the on-board system 1 performs start control of the engine based on a user operation on a start button 6 described later.

The lock/unlock area Lx is an area to perform the predetermined vehicle control, such as lock and unlock of the door by the on-board system 1, based on the presence of the portable device 2 inside the area. The lock/unlock area Lx is one kind of an outdoor operation area and can also be referred to as a passive entry area. For example, a vicinity of a door for the driver's seat, a vicinity of a door for a front passenger seat, and a vicinity of a trunk door are set as the lock/unlock area Lx. The vicinity of the door means a range within a predetermined operation distance from an external door handle. The external door handle means a gripping member disposed on an outer surface of the door to open and close the door.

The operation distance of specifying a size of the lock/unlock area Lx is, for example, 1.5 m. Obviously, the operation distance may be 1 m or may be 0.7 m. The operation distance is set smaller than 2 m from the aspect of security. Hereinafter a region further outside the lock/unlock area Lx in outside the vehicle interior is referred to as a non-operation area. The non-operation area may include an unlock inhibition area far from the vehicle by 2 m or more.

The on-board system 1 may authenticate the portable device 2 by, for example, a challenge response method. Since the authentication process involves a process of collating a response code generated by the portable device 2 based on the key information with a validation code held or dynamically generated by the vehicle Hv, the authentication process can be rephrased as a collation process. Details of the authentication process are separately described later. The successful authentication of the portable device 2 is equivalent to determination that the person who attempts to access the vehicle Hv is an authentic user.

(Configuration of On-Board System 1)

Here, the configuration and the operation of the on-board system 1 are described. As illustrated in FIG. 1, the on-board system 1 includes a smart ECU 4, a plurality of the door buttons 5, the start button 6, a plurality of BLE communication devices 7, a power supply ECU 11, a body ECU 12, a body system actuator 13, and a body system sensor 14. The ECU in the member name is an abbreviation for an Electronic Control Unit and means an electronic control device.

The smart ECU 4 is connected to each of the door button 5, the start button 6, and the BLE communication device 7 with a dedicated signal line. The smart ECU 4 is communicatively connected to the power supply ECU 11, the body ECU 12, and the like mutually via an in-vehicle network Nw. The in-vehicle network Nw is a communication network established inside the vehicle Hv. As a standard of the in-vehicle network Nw, various standards, such as a Controller Area Network (hereinafter, CAN: registered trademark) and Ethernet, can be employed. A part of the body ECU 12 or the like may be connected to the smart ECU 4 with a leased line without via the in-vehicle network Nw. The connection configuration between the devices is appropriately changeable.

The smart ECU 4 collaborates with the BLE communication device 7 or the like to estimate the position of the portable device 2. The smart ECU 4 achieves the vehicle control according to the estimation result of the position of the portable device 2 by collaboration with another ECU. The smart ECU 4 is achieved using a computer. That is, the smart ECU 4 includes, for example, a processor 41, a RAM 42, a storage 43, an I/O 44, and a bus line that connects these configurations. The smart ECU 4 of this embodiment is built into one BLE communication device 7. The smart ECU 4 is equivalent to a vehicle authentication device.

The processor 41 is hardware (in other words, a computing core) for a computation process combined with the Random Access Memory (RAM) 42. The processor 41 is, for example, a Central Processing Unit (CPU). The processor 41 performs various processes to achieve functions of respective functional units described later by access to the RAM 42. The RAM 42 is a volatile storage medium. The storage 43 has a configuration including a non-volatile storage medium, such as a flash memory. The storage 43 stores various programs executed by the processor 41. Executing the program by the processor 41 is equivalent to performing a method corresponding to the program, for example, the device position estimation method. The I/O 44 is a circuit module to communicate with another device. The I/O 44 is achieved using an analog circuit element, an IC, and the like.

In the storage 43, the device ID for each of the portable devices 2 is registered. The storage 43 stores communication device setting data indicating the mounting position of each of the BLE communication devices 7 in the vehicle Hv. The storage 43 is equivalent to a storage device storing the communication device setting data. For example, the mounting position of each of the BLE communication devices 7 may be expressed as a point on a vehicle coordinate system as a two-dimensional coordinate system parallel to both of the width direction and the front-rear direction of the vehicle Hv with any position of the vehicle Hv as the center. An X-axis forming the vehicle coordinate system can be set to parallel to the vehicle width direction, and a Y-axis can be set to parallel to the front-rear direction of the vehicle. As the center of the coordinate system, for example, the center of the vehicle body and a center of a rear wheel axle can be employed.

A unique communication device number is set to each of the BLE communication devices 7 included in the on-board system 1. The communication device number functions as information to identify the plurality of BLE communication devices 7. In the storage 43, as the communication device setting data, an installation position of each of the BLE communication devices 7 is made to correspond to the communication device number and stored. The details of the function of the smart ECU 4 are separately described later.

The door button 5 is a button for the user to unlock and lock the door of the vehicle Hv. The door button 5 is disposed on the external door handle disposed on each of the doors or in the vicinity thereof. When the user presses the door button 5, an electric signal indicating the fact is output to the smart ECU 4. As a configuration to accept at least any one of an unlock command and a lock command of the user, a touch sensor can be employed. The touch sensor is a device that detects that the user touches the door handle. The touch sensor may be disposed instead of the door button 5 or on the external door handle together with the door button 5.

The start button 6 is a push switch for the user to switch on/off of a traveling power supply. The traveling power supply is a power supply for the vehicle Hv to travel and means an ignition power supply when the vehicle is an engine car. When the vehicle Hv is the electric vehicle or the hybrid vehicle, the traveling power supply means a system main relay. The start button 6 can be interpreted as a switch to start the driving source (for example, an engine). When the user performs a push operation, the start button 6 outputs an electric signal indicating the fact to the smart ECU 4.

Figure 2:
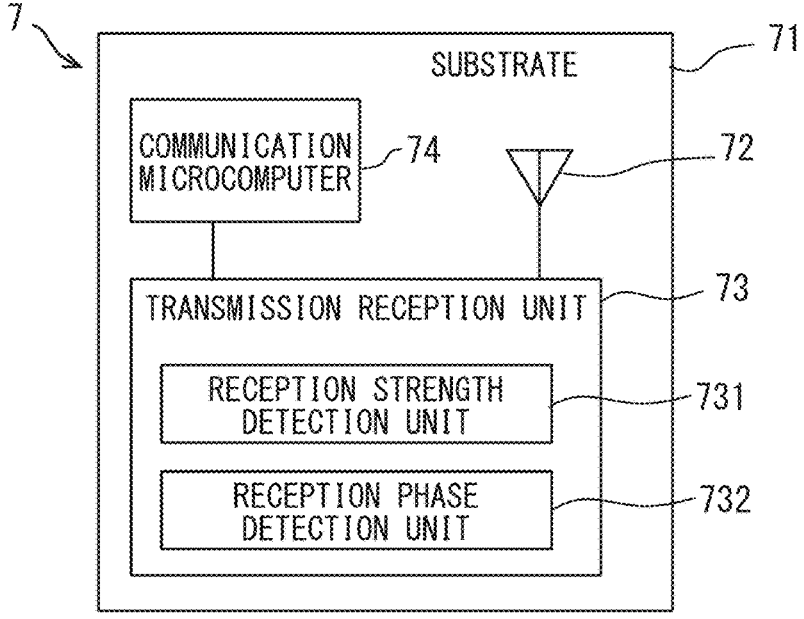
FIG. 2 is a block diagram illustrating a configuration of a BLE communication device.

The BLE communication device 7 is a communication module to perform the wireless communication with the portable device 2 according to the BLE standard. As illustrated in FIG. 2, each of the BLE communication devices 7 includes a substrate 71, an antenna 72, a transmission reception unit 73, and a communication microcomputer 74. The substrate 71 is, for example, a printed circuit board. The substrate 71 includes, for example, an electronic component constituting the BLE communication device 7, such as the antenna 72. The antenna 72 is an antenna to transmit and receive a frequency band used for the BLE communication, that is, a radio wave in a 2.4 GHz band. The 2.4 GHz band is equivalent to an example of a predetermined frequency band. The frequency band provided for the BLE communication is from 2400 MHz to 2483.5 MHz. The antenna 72 is electrically connected to the transmission reception unit 73. The antenna 72 may be an array antenna formed by arranging a plurality of antenna elements.

The transmission reception unit 73 demodulates the signal received by the antenna 72 and provides the signal to the communication microcomputer 74. The transmission reception unit 73 modulates a signal input from the smart ECU 4 via the communication microcomputer 74, outputs the signal to the antenna 72, and radiates the signal as a radio wave. The transmission reception unit 73 is mutually communicatively connected to the communication microcomputer 74. The transmission reception unit 73 includes a reception strength detection unit 731 and a reception phase detection unit 732. The reception strength detection unit 731 has a configuration of sequentially detecting a strength of the signal received by the antenna 72. The signal or a measurement value itself indicating the reception strength detected by the reception strength detection unit 731 may be also referred to as a Received Signal Strength Indicator/Indication (RSSI). The reception strength detected by the reception strength detection unit 731 is made to correspond to the device ID indicating the transmission source of the reception signal and is sequentially provided to the communication microcomputer 74.

When a Continuous Wave (CW) signal for ranging is received, the reception phase detection unit 732 detects a reception phase as a phase angle of the reception signal with respect to an output signal of a local oscillator. For example, the reception phase is equivalent to an output value of an arctangent with a ratio of Q (Quadrature-Phase) component to an I (In-Phase) component of the reception signal as an input value. The magnitude of the I component is equivalent to a strength of an in-phase component of the reception signal. The magnitude of the Q component is equivalent to a strength of an orthogonal component of the reception signal. The I component is obtained by multiplying the reception signal by a carrier wave output from the local oscillator. The Q component is obtained by multiplying the reception signal by a phase shift signal obtained by shifting a phase of the output signal from the local oscillator by 90°. The phase shift signal can be obtained by causing the output signal of the local oscillator to pass through a phase shift circuit as a circuit shifting the phase by 90°. The local oscillator is a circuit that generates a sine wave or a cosine wave of a conveyance frequency and is achieved by using, for example, a Voltage-Controlled Oscillator (VCO). The phase detected by the reception phase detection unit 732 is made to correspond to a frequency of the reception signal and output to the communication microcomputer 74. The reception phase may be identified based on an IQ signal where the frequency is reduced down to a base band.

The communication microcomputer 74 is a microcomputer that controls delivery and receipt of data with the smart ECU 4. The communication microcomputer 74 is achieved using a CPU, a RAM, a Read Only Memory (ROM), and the like. The communication microcomputer 74 provides the reception data input from the transmission reception unit 73 to the smart ECU 4 sequentially or based on the request from the smart ECU 4. The communication microcomputer 74 has a function that authenticates the device ID of the portable device 2 and performs cryptographic communication with the portable device 2 based on the request from the smart ECU 4. As the method of encryption, various methods can be employed.

The communication microcomputer 74 outputs data indicating the reception strength detected by the reception strength detection unit 731 to the smart ECU 4 based on the request from the smart ECU 4. The communication microcomputer 74 may sequentially output the reception strength data to the smart ECU 4 regardless of the presence/absence of the request from the smart ECU 4. The communication microcomputer 74 outputs phase information at each frequency of the reception signal to the smart ECU 4 autonomously or based on the command from the smart ECU 4 similarly to the reception strength.

Figure 3:
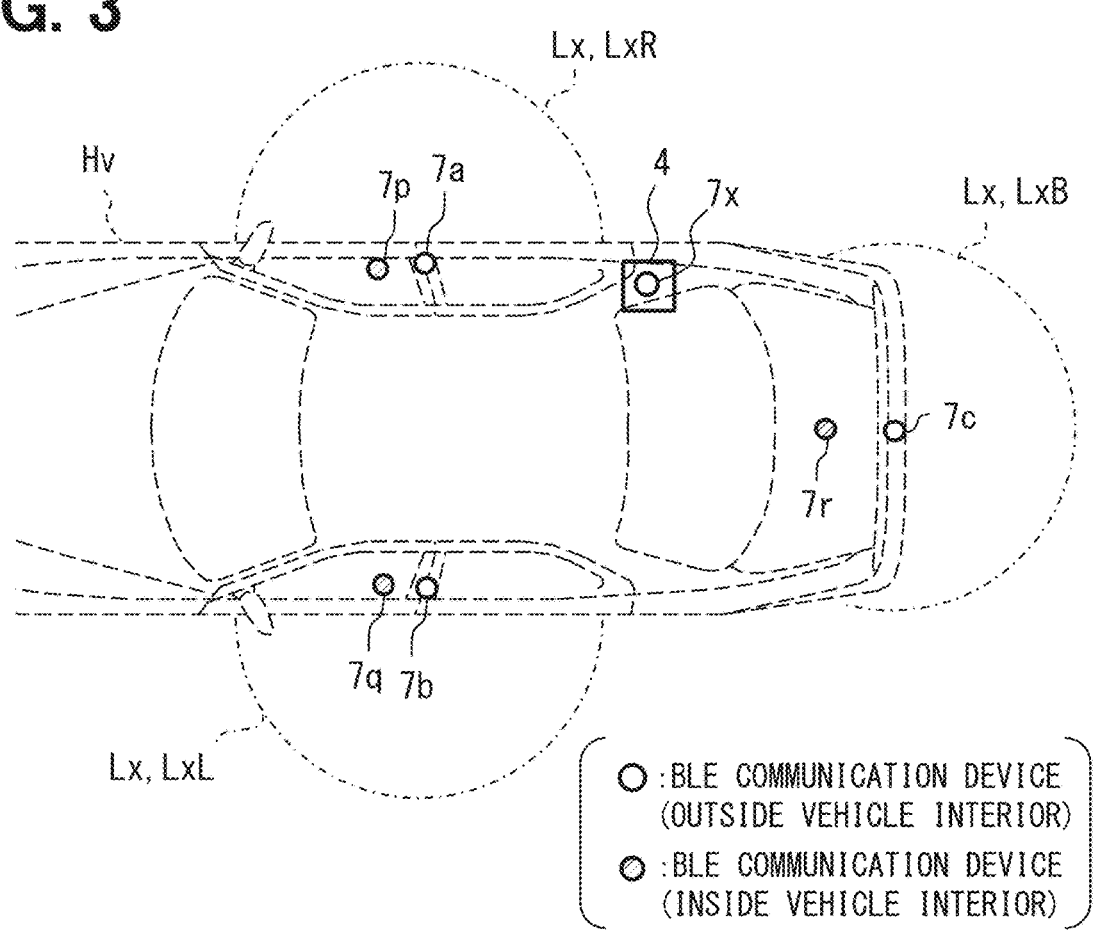
FIG. 3 is a drawing illustrating an example of a mounting position of the BLE communication device.

At least one BLE communication device 7 is disposed in the vehicle Hv. In this embodiment, as one example, one BLE communication device 7 is built into the smart ECU 4. The plurality of BLE communication devices 7 are dispersedly disposed at a plurality of portions of the vehicle outside the smart ECU 4. In this embodiment, as one example, as illustrated in FIG. 3, BLE communication devices 7a to 7c, 7p to 7r, and 7x are provided.

The BLE communication device 7a is disposed on an outer surface of a pillar B at the right side door. The BLE communication device 7b is disposed on an outer surface of a pillar B at the left side door. For example, the BLE communication devices 7a, 7b are disposed in regions within 30 cm of upper sides of belt lines among the pillars B disposed on the right and left doors. The belt line is a line along a lower end portion of a side window and may be also referred to as a waist line. The BLE communication device 7c is disposed at a center portion in the right-left direction of a rear bumper.

The BLE communication devices 7a to 7c are equivalent to outdoor units as the BLE communication devices 7 disposed on the outer surfaces of the vehicle. The BLE communication devices 7a to 7c as the outdoor units are equivalent to a configuration that mainly receives the signal from the portable device 2 present outside the vehicle. The outdoor unit is preferably disposed on the pillar B or in the vicinity of the external door handle such that the signal from the portable device 2 carried by the user who is about to board the vehicle Hv can be properly received. In this embodiment, as one example, each of the outdoor units forms the individual lock/unlock area Lx. For example, the BLE communication device 7a forms a right side area LxR as the lock/unlock area Lx on the right side of the vehicle. The BLE communication device 7b forms a left side area LxL as the lock/unlock area Lx on the left side. The BLE communication device 7c forms a rear side area LxB as the lock/unlock area Lx in the vicinity of the rear end portion.

The pillar B includes a door-side pillar B included in a door module and a vehicle body-side pillar B as a support pillar/frame including a roof portion of the vehicle body. The door-side pillar B is equivalent to a part that abuts on the vehicle body-side pillar at a front seat door or a rear seat door. The pillar B in the following mainly mean the door-side pillar B. Unless otherwise stated, the door-side pillar B as the installation position of the outdoor unit means a part adjacent to a side window, that is, a part on the upper side with respect to the lower end portion of the side window. As another aspect, the outdoor unit may be disposed on a part on a lower side of a window frame of the door-side pillar B and the vehicle body-side pillar B. The pillar B means the second pillar from the front among the pillars included in the vehicle Hv. The pillar B may be also referred to as a center pillar. The third pillar from the front or the pillar positioned on a rear side of the rear seat is referred to as a pillar C. A pillar A is equivalent to the frontmost pillar and a pillar positioned on a front side of the front seat.

The BLE communication device 7p is disposed at a position on a lower side of a window portion by 0.1 m or more in a surface portion on a vehicle inner side of a metal panel constituting a right-side front door. For example, the BLE communication device 7p is disposed in a region within 20 cm from a floor in an indoor side surface at the right-side front door. The right-side front door means a door for the front seat on the right side. The BLE communication device 7q is disposed at a position corresponding to the BLE communication device 7p on the left side of the vehicle. That is, the BLE communication device 7q is disposed at a position on the lower side of the window portion by 0.1 m or more in a surface portion on the vehicle inner side of the metal panel constituting the left-side front door. The left-side front door means a door for the front seat disposed on the left side of the vehicle. The BLE communication device 7r is disposed on a trunk room or a back surface portion of a backrest portion of the rear seat.

The BLE communication devices 7p to 7r are equivalent to indoor units as the BLE communication devices 7 disposed inside the vehicle interior. The BLE communication devices 7p to 7r as the indoor units are equivalent to a configuration that mainly receives the signal from the portable device 2 present inside the vehicle.

The indoor unit is preferably disposed at a position where outside the vehicle is out of sight. The out of sight of the certain BLE communication device 7 is a region where the signal transmitted from the BLE communication device 7 is not directly reached. The signal transmitted from the BLE communication device 7 may 7 may reach the out of sight by being reflected by various constructions. That is, even when the portable device 2 is present out of sight of the BLE communication device 7, both can perform wireless communication by reflection, diffraction, and the like at the construction.

The indoor unit is disposed at a position out of a position paired to the outdoor unit with the metal plate, such as the door, interposed therebetween. The position paired means a position in a relationship of back and front between which the metal body is sandwiched. More specifically, a range where a distance from the outdoor unit of less than 20% of a target wavelength may be equivalent to a position paired to the outdoor unit. Accordingly, the indoor unit is disposed at a position 20% or more, or more preferably 40% or more apart from the target wavelength from the outdoor unit. The target wavelength here is the wavelength of the signal provided for the BLE communication and is about 122 mm. Accordingly, 20% of the target wavelength is about 2.5 cm and 40% of the target wavelength is about 5 cm. The above-described arrangement aspect is equivalent to a configuration where the indoor unit is disposed at a position apart from the outdoor unit at least 10 cm or more in the up-down or front-rear direction.

The BLE communication device 7x is built into the smart ECU 4. FIG. 3 illustrates an aspect of the smart ECU 4 being mounted on the right side pillar C as one example. The smart ECU 4 may be housed inside an instrument panel. As the housing portion of the smart ECU 4, an inside of an upper surface portion of the instrument panel, an inside of a center garnish, and the like can be employed. The BLE communication device 7x is preferably positioned and disposed so as to ensure performing communication also with the portable device 2 present outside the vehicle, in addition to inside the vehicle interior. The smart ECU 4 including the BLE communication device 7x may be disposed at a position where outside the vehicle interior can be seen through via the window portion, such as a ceiling portion inside the vehicle interior. The BLE communication device 7x may be disposed separately from the smart ECU 4.

The mounting position of the BLE communication device 7 described above is an example and appropriately changeable. For example, the BLE communication devices 7a, 7b as the outdoor units may be built into the external door handle for the front seat or may be disposed, for example, in a rocker portion below the door. The rocker portion also includes an inner part of a side sill cover. The mounting position of the BLE communication device 7c may be in the vicinity of a rear license plate, in the vicinity of the rear window, in the vicinity of a door handle for the trunk, and the like. In the description of the mounting position of the BLE communication device 7, "in the vicinity" of a certain member means a range, for example, within 30 cm from the member. For example, the vicinity of the license plate means a range within 30 cm from the license plate. The vicinity of the door handle also includes the inside of the door handle.

The BLE communication devices 7p, 7q as the indoor units may be disposed at the root of the vehicle body-side pillar B and in the vicinity of feet of the driver's seat and the front passenger seat. The root of the vehicle body-side pillar B means a part within 20 cm from the floor surface. The BLE communication devices 7p, 7q may be disposed in the vicinity of an inner door handle, a door switch panel, a door pocket, an arm rest, and the like. The BLE communication device 7r may be buried in a center of the rear seat, for example. The number of the BLE communication devices 7 included in the on-board system 1 may be 6 or less or may be 8 or more. The on-board system 1 may include the BLE communication device 7 disposed in the vicinity of a front bumper/emblem.

Among the BLE communication devices 7 included in the on-board system 1, the one used for data communication with the portable device 2 is referred to as a representative device or a gateway communication device in the present disclosure. In the present disclosure, the BLE communication device 7x basically operates as the representative device. The setting of the representative device is dynamically changed by the processor 41.

The smart ECU 4 uses any of the plurality of BLE communication devices 7 to perform a key exchange protocol (what is called pairing) with the portable device 2. Device information as information on the portable device 2 acquired by the pairing is stored in the storage 43 and also stored in a non-volatile memory included in the communication microcomputer 74 of each of the BLE communication devices 7. The device information is, for example, the key exchanged by the pairing, and the device ID. When the vehicle Hv is shared by a plurality of users, the device information on each of the portable devices 2 held by each of the users is stored. When the vehicle Hv is a service car, the smart ECU 4 may acquire the device information corresponding to the user who makes reservation from a digital key server that issues the key information in advance and temporarily store the device information in a predetermined storage medium.

The BLE communication device 7x or eventually the on-board system 1 receives the signal transmitted from the portable device 2, for example, the advertising signal and a scan response signal to detect that the portable device 2 is present within the range of ensuring the short-range communication with the on-board system 1. The scan response signal is equivalent to a response signal emitted from the slave with respect to a scan request signal emitted from the master. Here, as one example, the portable device 2 present around the vehicle is detected by a passive scan method in which the BLE communication device 7x behaves as the master. The on-board system 1 may search the portable device 2 by an active scan method involving transmission of the scan request. The two kinds of scan methods may be used according to the scene.

When the advertising signal and the scan response signal from the portable device 2 are received, the BLE communication device 7x uses the already stored device information to automatically establish the communication connection with the portable device 2. The smart ECU 4 starts the encrypted data communication with the portable device 2. When the BLE communication device 7x establishes the communication connection with the portable device 2, the BLE communication device 7x provides the device ID of the portable device 2 in communication connection to the smart ECU 4 as connection device information.

In the BLE communication, in a state in which the communication connection between the devices is established, data is transmitted and receive while sequentially changing 37 channels. The BLE communication device 7x as the representative device sequentially provides information indicating the channel used for the communication with the portable device 2 (hereinafter, channel information) to a communication control unit F2. The channel information may be a specific channel number or may be a parameter (what is called hopIncrement) indicating a transition rule of the used channel. The hopIncrement is a number from 5 to 16 randomly determined during the communication connection. The channel information preferably includes the current channel number and the hopincrement.

Each of the BLE communication devices 7 disposed outside the smart ECU 4 is mutually communicatively connected to the smart ECU 4 via a dedicated communication line or the in-vehicle network Nw. Each of the BLE communication devices 7 operates based on a control signal from the communication control unit F2 included in the smart ECU 4. Each of the BLE communication devices 7 provides the reception data and information on the reception situation of the signal from the portable device 2 to the smart ECU 4. The information on the reception situation of the signal from the portable device 2 will be separately described later.

The power supply ECU 11 is an ECU that controls the on/off-state of the traveling power supply mounted on the vehicle Hv. For example, the power supply ECU 11, for example, sets the traveling power supply to on based on the instruction signal from another ECU, such as the smart ECU 4 and the body ECU 12. When the vehicle Hv is the engine car, the power supply ECU 11 causes the engine to start based on the instruction signal.

The body ECU 12 is an ECU that controls the body system actuator 13 based on the request from the smart ECU 4 or the user. The body ECU 12 is communicatively connected to the various body system actuators 13 and the various body system sensors 14. The body system actuator 13 here, for example, is a door lock motor constituting a lock mechanism of each of the doors. The body system sensor 14 includes a courtesy switch disposed for each of the doors or the like. The courtesy switch is a sensor that detects opening and closing the door. The body ECU 12, for example, based on the request from the smart ECU 4, outputs the predetermined control signal to the door lock motor disposed on each of the doors of the vehicle Hv to lock and unlock each of the doors.

(Portable Device 2)

The portable device 2 is a general-purpose information processing terminal that can be carried and has a BLE communication function. A digital key application 204 as an application to function as the electronic key of the vehicle Hv has been installed. As the portable device 2, for example, a smartphone, a tablet terminal, a wearable device, and the like can be employed. The wearable device is a device mounted on a body of the user for use, and wearable devices having various shapes, such as a wristband type, a wrist-watch type, a ring type, an eye glasses type, and an earphone type can be employed.

The portable device 2 may be a smart key as a dedicated device as the electronic key of the vehicle Hv. The smart key is a device transferred to an owner together with the vehicle Hv when the vehicle Hv is purchased. The smart key can be interpreted as one attachment of the vehicle Hv. The smart keys having various shapes, such as a flat rectangular parallelepiped shape type, a flat ellipsoid type (what is called a fob type), and a card type can be employed. The smart key may be referred to as a vehicle portable device, a key fob, a key card, an access key, and the like.

Figure 4:
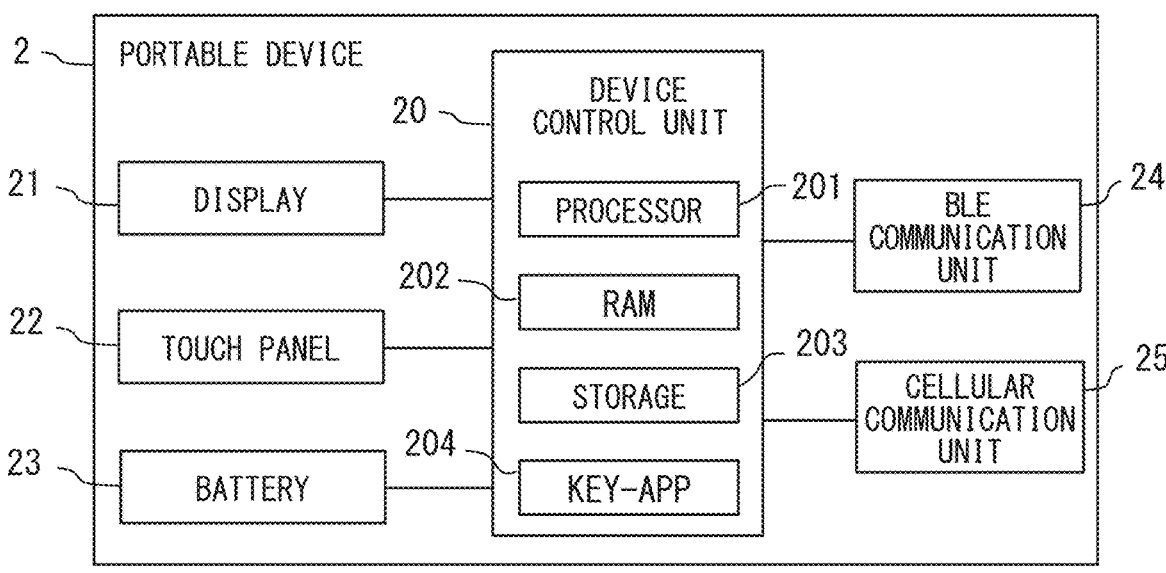
FIG. 4 is a block diagram illustrating a configuration of a portable device.

As illustrated in FIG. 4, the portable device 2 includes a device control unit 20, a display 21, a touch panel 22, a battery 23, a BLE communication unit 24, and a cellular communication unit 25.

The display 21 is, for example, a liquid crystal display and an organic EL display. The display 21 displays an image according to the input signal from the device control unit 20. The touch panel 22 is a capacitive touch panel and stacked on the display 21. The touch panel 22 and the display 21 are equivalent to interfaces to register the key information with the portable device 2 by the user and pair the portable device 2 with the on-board system 1. The battery 23 is a secondary battery, such as a lithium-ion battery.

The BLE communication unit 24 is a communication module to perform the BLE communication. The schematic configuration of the BLE communication unit 24 can be similar to that of the BLE communication device 7. The BLE communication unit 24 is mutually communicatively connected to the device control unit 20. The BLE communication unit 24 receives the data transmitted from the vehicle Hv, provides the data to the device control unit 20, modulates the data input from the device control unit 20, and transmits the data to the vehicle Hv.

The cellular communication unit 25 is a communication module to connect to the Internet via a wireless base station and configured to ensure performing the wireless communication compliant to the standards, such as 4G and 5G. The cellular communication unit 25, for example, may receive a data package to install the digital key application 204 from a predetermined application distribution server. The cellular communication unit 25 is any given element and may be omitted. Instead of the cellular line, such as 4G and 5G, the portable device 2 may be configured to allow Internet access via a Wi-Fi line.

The device control unit 20 is, for example, configured as a computer including a processor 201, a RAM 202, a storage 203, and the like. The digital key application 204 has been installed to the storage 203 or the like. The storage 203 stores the key information. The digital key application 204 is an application to securely perform, for example, acquisition, storage, and the authentication processes of the key information. The digital key application 204 is any given element and may be omitted.

The device control unit 20 causes the BLE communication unit 24 to transmit the advertising signal at a predetermined transmission interval. As another aspect, the portable device 2 may have an aspect of transmitting a scan response based on the request from the on-board system 1, for example, a scan request.

When the reception data is input from the BLE communication unit 24, the device control unit 20 generates a baseband signal equivalent to a response signal corresponding to this reception data, and outputs the baseband signal to the BLE communication unit 24. For example, when the BLE communication unit 24 receives a challenge code, the BLE communication unit 24 generates the response code using a predetermined procedure/function based on the challenge code and the key information. The baseband signal including the response code is output to the BLE communication unit 24. The baseband signal output from the device control unit 20 to the BLE communication unit 24 is modulated by the BLE communication unit 24 and transmitted as the wireless signal.

The device control unit 20 need not send back the response code in a downtime set by the user. The configuration allows reducing a possibility of successful authentication in a situation where the user does not intend to use the vehicle Hv. The downtime may be manually set by the user so as to correspond to a time slot during which there is no possibility of using the vehicle Hv. For example, a time slot during which the user goes to bed or a time slot during which the user goes to school or a company may be set as the downtime. The downtime may be automatically registered from action log information of the user. The action log of the user may be identified based on location information of the portable device 2, such as a GPS.

When the portable device 2 is stationary for a certain period of time or more, the device control unit 20 may be configured not to send back the response code. Whether the portable device 2 is stationary or not, for example, may be identified based on an output from an acceleration sensor and a gyro sensor included in the portable device 2.

When the operation of the BLE communication unit 24 is controllable in units of the applications, the device control unit 20 may stop the transmission of the advertising for the vehicle Hv in the downtime. The configuration allows suppressing electric power consumption by unnecessary advertising. When the operation of the BLE communication unit 24 is controllable in units of the applications, the device control unit 20 may stop the transmission of the advertising for the vehicle Hv based on a fact that the portable device 2 is stationary for a certain period of time or more. The device control unit 20 may be configured to inhibit the communication connection with the on-board system 1 based on a fact that the downtime or the portable device 2 is stationary for a certain period of time or more.

(Functions of Smart ECU 4)

Figure 5:
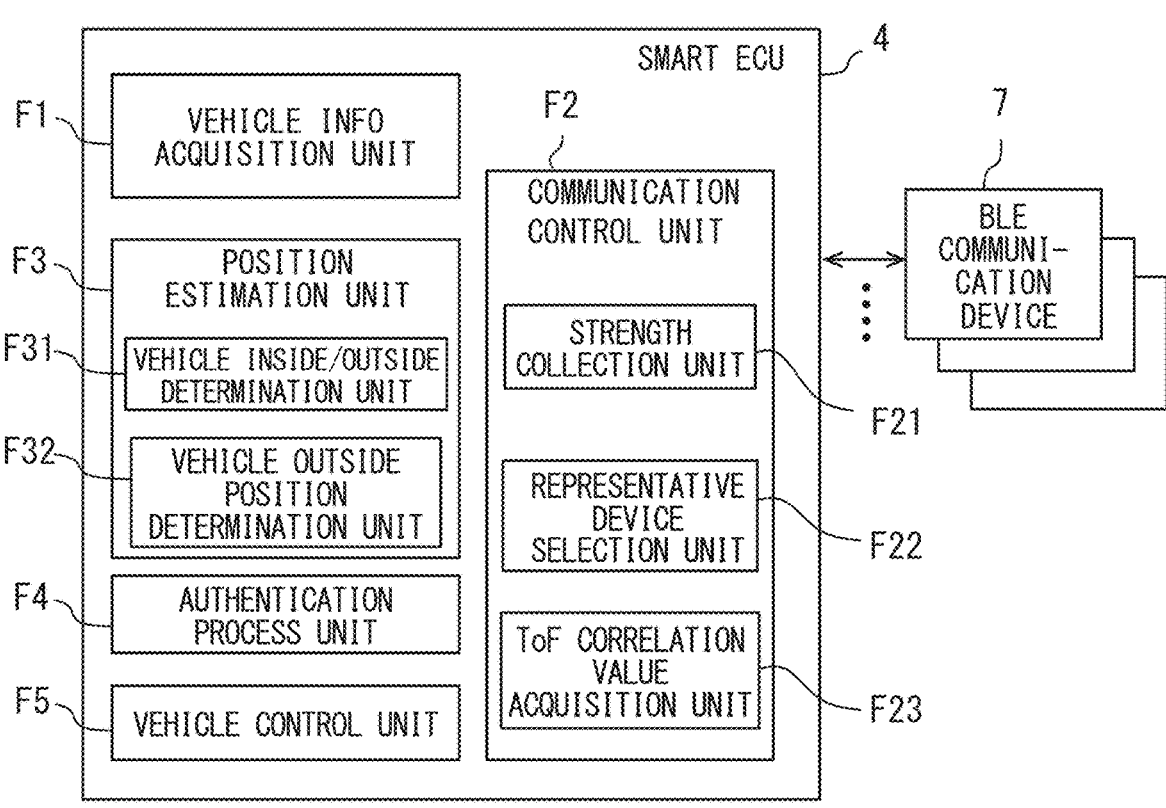
FIG. 5 is a function block diagram of a smart ECU.

Here, the functions and the operations of the smart ECU 4 are described using FIG. 5. The smart ECU 4 executes the program stored in the storage 43 to provide functions corresponding to various function blocks illustrated in FIG. 5. That is, the smart ECU 4 includes, as the function blocks, a vehicle information acquisition unit F1, the communication control unit F2, a position estimation unit F3, an authentication process unit F4, and a vehicle control unit F5. The communication control unit F2 includes, as sub-functional units, a strength collection unit F21, a representative device selection unit F22, and a ToF correlation value acquisition unit F23. The position estimation unit F3 includes, as sub-functional units, a vehicle inside/outside determination unit F31 and a vehicle outside position determination unit F32. The smart ECU 4 includes a key information storage unit M1.

The key information storage unit M1 is a storage medium to store the information of the portable device 2 used as the electronic key of the vehicle Hv. The key information storage unit M1 stores at least one piece of information on the portable device 2. The key information storage unit M1 stores the key information for each of the portable devices 2 made to correspond to a key ID, the device ID, a user ID, and the like. The user ID is an identifier to identify a plurality of users and set for each user. Information, such as an expiration period, an authority, and a seat position, may be associated with the key information and stored.

The key information storage unit M1 is achieved using a part of a storage area included in the storage 43. The key information storage unit M1 may be achieved using a non-volatile storage medium that is physically independent from the storage 43. On the key information storage unit M1, writing, reading, and deletion of data, and the like can be performed by the processor 41.

The vehicle information acquisition unit F1 acquires various pieces of vehicle information indicating a state of the vehicle Hv from, for example, the sensor, the ECU, and the switch mounted on the vehicle Hv. For example, the vehicle information is equivalent to the state of the vehicle power supply, the open/close state of each of the doors, the lock/unlock state of each of the doors, the presence/absence of pressing of the door button 5, the presence/absence of pressing of the start button 6, and shift position. The state of the vehicle power supply includes whether the traveling power supply is on. The kind of the vehicle information is not limited to the ones described above. The vehicle information can include an output value of a brake sensor that detects a depressing amount/depressing force of a brake pedal and a signal indicating an operating state of a parking brake.

The vehicle information acquisition unit F1 identifies the current state of the vehicle Hv based on the above-described various pieces of information. For example, when the engine is off and all doors are locked, the vehicle information acquisition unit F1 determines that the vehicle Hv is parked. The condition to determine that the vehicle Hv is parked only needs to be appropriately designed, and various determination conditions are applicable. Acquisition of the electric signals from the door button 5 and the start button 6 is equivalent to detection of the user operations on these buttons. The vehicle information acquisition unit F1 detects the operation of the user on the vehicle Hv, such as opening and closing the door, pressing of the door button 5, pressing of the start button 6, and opening and closing the door.

The communication control unit F2 controls the operation of the BLE communication device 7. The communication control unit F2 performs data communication with the portable device 2 using the BLE communication device 7x. For example, the communication control unit F2 generates data addressed to the portable device 2 in communication connected and outputs the data to the BLE communication device 7x. Thus, the signal corresponding to the desired data is transmitted as a radio wave. The communication control unit F2 receives the data from the portable device 2 received by the BLE communication device 7x. In this embodiment, as a more preferable aspect, the wireless communication between the smart ECU 4 and the portable device 2 is encrypted.

The communication control unit F2 recognizes the presence of the user around the vehicle Hv based on the reception of the BLE signal transmitted from the portable device 2. The communication control unit F2 acquires the device ID of the portable device 2 in communication connection from the BLE communication device 7x. Even when the vehicle Hv is a vehicle shared by a plurality of users, the smart ECU 4 identifies the user present around the vehicle Hv based on the device ID of the portable device 2 in communication connection with the BLE communication device 7.

The communication control unit F2 acquires the reception strength at each of the frequencies of the signal from the portable device 2 from each of the BLE communication devices 7. The configuration of acquiring the reception strength at each of the frequencies and for each of the communication devices is equivalent to the strength collection unit F21.

The communication control unit F2 may temporarily change the representative device to determine the position of the portable device 2. For convenience, a state in which the BLE communication device 7x is set as the representative device is referred to as a basic state. A state in which the BLE communication device 7 other than the BLE communication device 7x is set as the representative device is referred to as a temporary change state. The sub-functional unit that changes the representative device is equivalent to the representative device selection unit F22.

The communication control unit F2 causes any BLE communication device 7 as the representative device to communicate with the portable device 2 in communication for ranging to acquire at least the ToF correlation value with reference to the representative device. The ToF correlation value is a parameter directly or indirectly indicating the time of flight of the radio wave from the BLE communication device 7 to the portable device. The communication for ranging is communication to measure a distance from the BLE communication device 7 as the representative device to the portable device 2. The distance from the BLE communication device 7 to the portable device 2 corresponds to the time of flight (ToF) of the signal. Identification of the distance to the portable device 2 is equivalent to identification of the ToF.

The ToF is determined based on a two-frequency phase difference and a round-trip time (RTT). The two-frequency phase difference and the RTT are equivalent to the ToF correlation value. The ToF correlation value can also be referred to as a distance correlation value. These ToF correlation values are parameters different from the reception strength. The two-frequency phase difference here is a difference of the transmission/reception phase difference of observed two frequencies different from one another. The two-frequency phase difference corresponds to an amount of displacement of a phase angle due to a change in the frequency. The transmission/reception phase difference is equivalent to a phase difference between the transmitted CW signal and the received CW signal. The transmission/reception phase difference may be also simply referred to as a phase angle. The two-frequency phase difference and the transmission/reception phase difference are conceptually same as the one known as the two-frequency CW method in the technical field of the ranging method using the radio wave.

In this embodiment, as one example, as the ToF correlation value, the two-frequency phase difference for each of combinations of frequencies is employed. In the BLE communication, since the two or more frequencies provided for the communication are present, the two or more two-frequency phase differences having different combinations of the frequencies, that is, a multiple frequency phase difference is obtained. The smart ECU 4 of this embodiment estimates the device distance based on the multiple frequency phase difference.

In the configuration using the multiple frequency phase difference as the ToF correlation value, the communication for ranging can be interpreted as communication to identify the transmission/reception phase difference for each of the two or more frequencies. Transmission and reception of the CW signals at a plurality of frequencies corresponds to the communication for ranging. The communication microcomputer 74 as the representative device observes a reception phase at a used frequency every time frequency hopping is performed. The communication microcomputer 74 identifies the transmission/reception phase difference based on the observed reception phase. The processor 41 acquires the transmission/reception phase difference at each of the frequencies from the communication microcomputer 74 as the representative device.

The transmission/reception phase difference may be calculated by the processor 41 based on reception phase information provided from the communication microcomputer 74. The data acquisition in the present disclosure is not limited to the aspect of the input from the outside, but also includes generation/detection by internal calculation. The processor 41 combines the transmission/reception phase difference at each of the frequencies to acquire a plurality of sets of the two-frequency phase difference for each of the combinations of the frequencies. The sub-functional unit that acquires the transmission/reception phase difference and eventually the two-frequency phase difference is equivalent to the ToF correlation value acquisition unit F23.

Besides, the communication control unit F2 may acquire the data indicating the reception phase of the CW signal at each of the frequencies also from the representative device. The communication control unit F2 also provides data indicating the reception situation of the signal from the portable device 2 in each of the BLE communication devices 7 to other function/circuit modules, such as the position estimation unit F3. The communication control unit F2 may acquire an arrival direction of the signal as information indicating the reception situation of the signal from the portable device 2. The arrival direction of the signal can be estimated by, for example, various methods, such as a MUSIC method and an ESPRIT method. The reception strength, the phase, and the arrival direction can be referred to as features of the reception signals.

The position estimation unit F3 estimates the position of the portable device 2 based on the reception situation of the signal from the portable device 2 in each of the BLE communication devices 7. The present disclosure may express the position of the portable device 2 as the device position. Since the portable device 2 corresponds to the user, the estimation of the position of the portable device 2 is equivalent to the estimation of the position of the user.

While the BLE communication device 7x is in communication connection with at least one portable device 2, the position estimation unit F3 sequentially performs the estimating process of the device position at a predetermined estimation interval. The estimation interval can be 100 milliseconds. The estimation interval may be, for example, 200 milliseconds and 150 milliseconds. The position estimating process by the position estimation unit F3 is separately described later. When the signal from the portable device 2 is received, even when the position estimation unit F3 is not in communication connection, the position estimation unit F3 may be configured to estimate the position of the transmission source based on the reception signal. When signals are received from the plurality of portable devices 2, the position estimation unit F3 may perform the process of estimating the positions of the respective plurality of portable devices 2 in parallel. The position estimation unit F3 may determine a position of an unregistered terminal, not limited to a terminal registered as the portable device 2.

The vehicle inside/outside determination unit F31 as the sub-functional unit of the position estimation unit F3 has a configuration of determining whether the portable device 2 is present inside the vehicle interior based on the reception strength of the signal from the portable device 2 observed by the BLE communication device 7. The vehicle outside position determination unit F32 has a configuration of determining whether the portable device 2 is present inside the lock/unlock area Lx based on distance information from the outdoor unit to the portable device 2 determined based on the ToF correlation value described later. The present disclosure also refers to the determination whether the portable device 2 is present inside the vehicle interior as vehicle inside/outside determination. The present disclosure also refers to the determination whether the portable device 2 is present in the lock/unlock area Lx as lock/unlock area determination. Details of operations of the position estimation unit F3 as the vehicle inside/outside determination unit F31 and the vehicle outside position determination unit F32 and the processor 41 are separately described later.

The authentication process unit F4 works with the BLE communication device 7x to perform a process of confirming (in other words, authenticating) that a communication destination is the portable device 2. The communication for authentication is performed to be encrypted. The authentication process itself only needs to be performed using various methods, such as the challenge response method. For example, the authentication process unit F4 transmits the predetermined/randomly generated challenge code to the portable device 2. Using the key information according to the device ID/key ID of the communication destination to the challenge code, a validation code is generated by the predetermined procedure. The response code sent back from the communication destination is compared with the validation code, and the authentication is determined as successful based on a fact that both are matched.

A timing at which the authentication process unit F4 performs the authentication process, for example, can be a timing at which communication connection is established between the BLE communication device 7 and the portable device 2. The authentication process unit F4 may be configured to perform the authentication process at a predetermined cycle while the BLE communication device 7 is in communication connection with the portable device 2. The communication for the authentication process may be configured to be performed by triggering the predetermined user operation on the vehicle Hv, for example, when the start button 6 is pressed and when the door is opened and closed by the user.

The vehicle control unit F5 has a configuration that performs the vehicle control according to the position of the portable device 2 (in other words, the user) and the state of the vehicle Hv in cooperation with the body ECU 12 or the like under the condition that the authentication of the portable device 2 by the authentication process unit F4 is successful. The state of the vehicle Hv is determined by the vehicle information acquisition unit F1. The device position is determined by the position estimation unit F3. For example, when the position estimation unit F3 determines that the portable device 2 is present inside the vehicle interior and pressing of the start button 6 by the user is detected, the vehicle control unit F5 works with the power supply ECU 11 to start the engine. The inside of the vehicle interior can also be referred to as a passive start area.

(Connection-Related Process)

Figure 6:
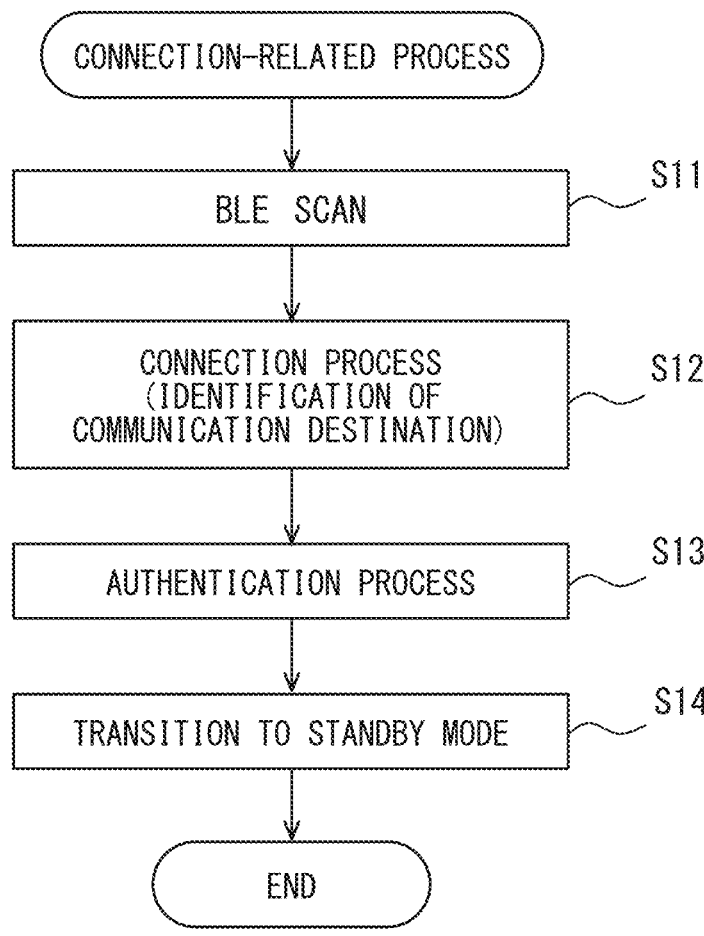
FIG. 6 is a flowchart about a connection-related process.

Here, using the flowchart depicted in FIG. 6, a connection-related process is described. The connection-related process is a process for communication connection with the portable device 2 approaching the vehicle Hv together with the user. The connection-related process is mainly performed at a predetermined scan interval in a state of the vehicle Hv being parked. The scan interval may be set, for example, 100 milliseconds and 200 milliseconds. The connection-related process includes steps S11 to S15. The connection-related process is performed by the processor 41 working with the BLE communication device 7x. All of the various flowcharts of the present disclosure are one example, and the number of steps included in each of the flowcharts and the process order thereof are appropriately changeable.

First, at the step S11, the communication control unit F2 sets the BLE communication device 7x in a standby state to search (what is called scan) the portable device 2. The standby state here mean a state of ensuring receiving the advertising signal. As a result of the scanning in the step S11, when none of the portable device 2 is detected, processes at and after the step S12 are omitted to end this flowchart.

In the step S12, the BLE communication device 7x is caused to perform the communication connection with the portable device 2 detected by the scanning in the step S11. The communication connection may be achieved by exchanging transmission of the connection request and a response for the connection request. The processor 41 identifies the communication destination based on, for example, transmission source information included in the advertising signal or the like. A detailed sequence from the scanning, the communication connection, and the start of cryptographic communication only need to be performed compliant to the BLE standard.

In the step S12, for example, using the challenge code and the key information of the communication destination stored in the key information storage unit M1, the authentication process of the communication destination is performed. As the challenge code, a random number having a predetermined length generated using a random number table, for example, can be employed. When the authentication of the communication destination is successful, the process moves to the step S15 to transition to a standby mode. As separately described using FIG. 7, the standby mode is equivalent to a state in which the unlock/lock, switching of on/off of the traveling power supply, and the like can be performed based on the user operation of the door button 5 or the like. The standby mode corresponds to a state in which the processor 41 recognizes that the authentic portable device 2 is present around the vehicle as one aspect. "Around the vehicle" includes the lock/unlock area Lx and the inside of the vehicle interior.

In this embodiment, as one example, as the determination result as the successful authentication, the expiration period is set. When the expiration period is expired, re-authentication is performed. Since the authentication process can be omitted within the expiration period, the power consumption in the portable device 2 and the smart ECU 4 can be inhibited. Since the authentication process is performed at each of the expiration periods, a possibility that the vehicle Hv is unauthorizedly used can be reduced. The expiration period may be changed depending on a scene, for example, whether during traveling. Since the possibility that the portable device 2 moves to the outside of the vehicle interior during traveling is small, the expiration period during traveling may be set longer by a predetermined amount than that during stopping the vehicle. For example, while the expiration period during stopping the vehicle is set to, for example, one second, two seconds, and five seconds, the expiration period during traveling may be set to, for example, 10 seconds and 20 seconds. The authentication process unit F4 may be configured to perform the authentication process again even when the expiration period remains when a predetermined event, such as opening and closing the door, is detected.

When the authentication of the portable device 2 fails, the smart ECU 4 may perform the authentication process again, or may operate a vehicle facility such that the user can recognize that the authentication does not succeed. For example, when the authentication does not succeed, a predetermined authentication failure image may be displayed on the on-board display/display 21 or a lighting device disposed on a side mirror or the like may be lit in a predetermined pattern. When the authentication fails, the smart ECU 4 may transmit a predetermined control signal to display an authentication failure screen on the display 21. The authentication that has not yet be successful may be expressed by a color of an irradiation light of a welcome light that emits light to a road surface around the door.

(Operation During Standby Mode)

Figure 7:
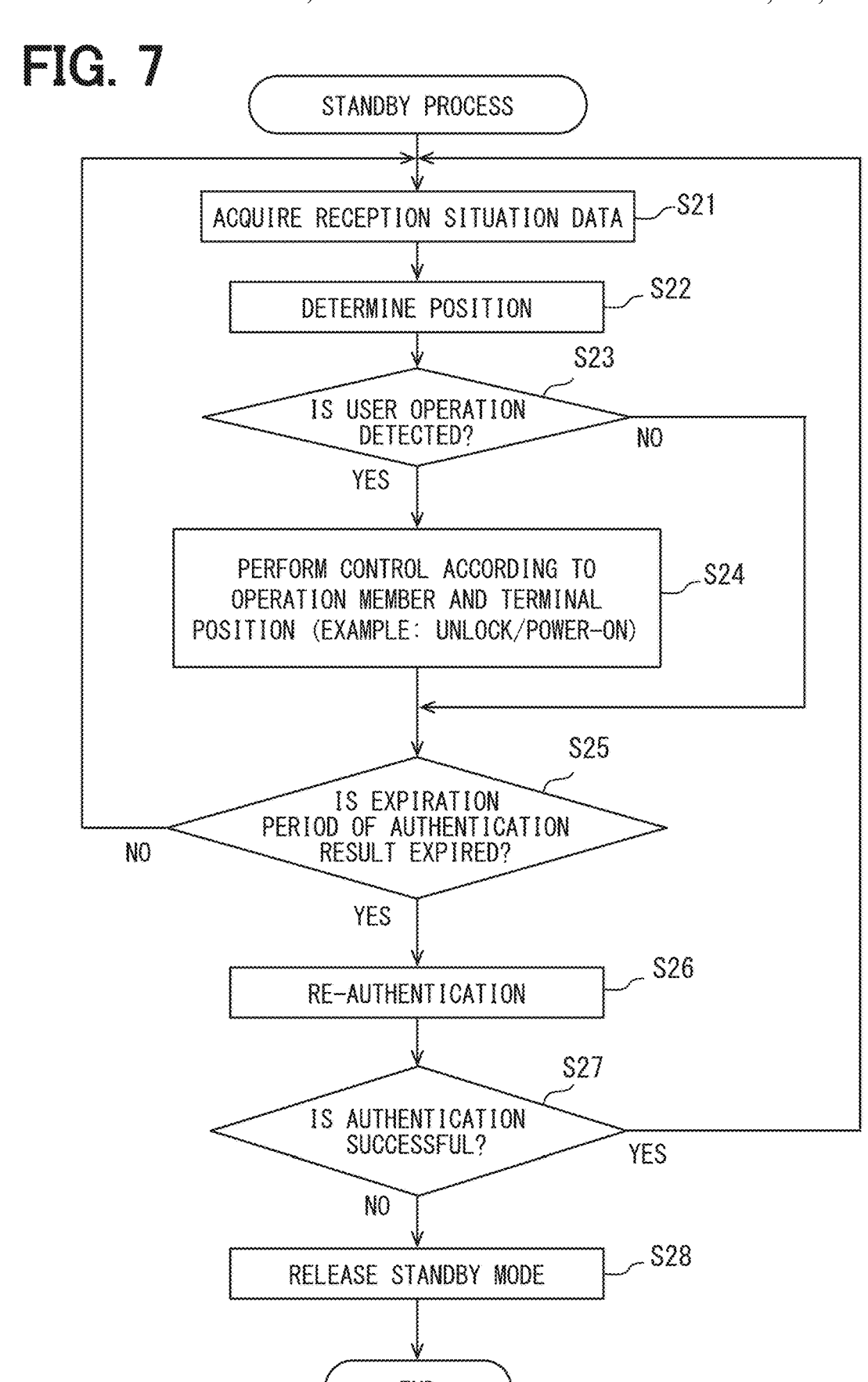
FIG. 7 is a flowchart about a standby process.

The operation of the smart ECU 4 during the standby mode is described using the flowchart depicted in FIG. 7. During the standby mode, the processor 41 sequentially performs steps S21 to S28 depicted in FIG. 7 as an example.

During the standby mode, as the step S21, the processor 41 sequentially acquires position estimation information as information to identify the position of the portable device 2 from each of the BLE communication devices 7. The position estimation information is, for example, the reception strength. The reception phase can also be included in the position estimation information. The ToF correlation value is also equivalent to one kind of the position estimation information. When the portable device 2 is determined to be present outside the vehicle interior, the processor 41 may acquire the transmission/reception phase difference at each of the frequencies or the two-frequency phase difference for each combination of the frequencies as the position estimation information from each of the outdoor units. In the system configuration of employing the RTT as the ToF correlation value, the processor 41 may acquire the RTT from each of the outdoor units. The ToF correlation value for each of the BLE communication devices 7 can be acquired by sequentially performing the communication for ranging on the plurality of BLE communication devices 7. As separately described later, by employing the sniffing method, without each of the BLE communication devices 7 individually performing bidirectional communication with the portable device 2, the ToF correlation value starting from the individual BLE communication device 7 can be acquired.

The step S22 is a step of determining the device position based on the position estimation information acquired by the processor 41 (the position estimation unit F3) from each of the BLE communication devices 7 in the step S21. Specifically, when whether the device position is inside the vehicle interior and when the device position is determined to be outside the vehicle interior, the processor 41 determines whether the device position is inside the lock/unlock area Lx. When the portable device 2 is determined to be present inside the lock/unlock area Lx, the processor 41 identifies whether the portable device 2 is present in any of the right side area LxR, the left side area LxL, and the rear side area LxB according to the ID of the closest communication device. The determination method of the device position is separately described later.

The step S22 is a step of determining whether the predetermined user operation is performed on the vehicle by the processor 41 based on the signals from the door button 5, the start button 6, the courtesy switch, and the like. When the signal corresponding to the user operation is input, the processor 41 performs the vehicle control according to the member operated by the user, the device position, and the state of the vehicle Hv as the step S24. For example, in the state of the vehicle Hv being locked, when the operation member is the door button 5 and the device position is determined to be inside the lock/unlock area Lx, the processor 41 (the vehicle control unit F5) unlocks the door. When the operation member is the start button 6 and the device position is determined to be inside the vehicle interior, the processor 41 sets the traveling power supply to on. Besides, in the state of a predetermined lock condition is met, when the door button 5 is pressed, the processor 41 locks the door. As the lock condition, the vehicle Hv being unlocked, the traveling power supply being off, the shift position being set to parking or neutral, the device position being determined to be inside the lock/unlock area Lx, and the like can be employed.

The vehicle control unit F5 may cancel the vehicle control when the device position determined by the position estimation unit F3 does not match the operating button position. The operating button position means the position of the button pressed by the user. The case where the device position does not match the operating button position corresponds to, for example, a case where the door button 5 for the driver's seat is pressed in a situation of the portable device 2 being at a position apart from the driver's seat, such as the front passenger seat and in the vicinity of the trunk. In the situation where the portable device 2 is determined to be present outside the vehicle interior, the case where the start button 6 is pressed may also correspond to the case where the position of the portable device 2 does not match the operating button position. When the touch sensor is applied instead of the button, the operating button position can be read differently as a touched position. The operating button position and the touched position are included in the concept of the operation member position.

In the step S25, whether the expiration period of the authentication result is expired, that is, whether the elapsed time after the determination of successful authentication in the step S14 or the step S26 described later becomes a predetermined time or more is determined. When the predetermined time does not elapse after the last determination of the successful authentication, that is, within the expiration period, the process returns to the step S21. On the other hand, when the predetermined time elapses after the last determination of the successful authentication, the processor 41 performs the communication to authenticate the portable device 2 again as the step S26.

When the successful authentication is determined as the result of the re-authentication process in the step S26, the standby mode is continued. That is, the processes at and after the step S21 are sequentially performed. On the other hand, when authentication fails, the processor 41 releases the standby mode as the step S28. The standby mode may be released based on the failure of the authentication process continuously by the specified number of times. The processor 41 may end the standby mode when the portable device 2 getting away from a predetermined authentication state maintenance area is detected, not limited to the case of failing the authentication. The end of the standby mode corresponds to discarding the authentication result. The authentication state maintenance area is, for example, a region of integrating the inside of the vehicle interior and the lock/unlock area Lx.

(Determination Method of Device Position)

Here, the determination method of the position of the portable device 2 is described. The determination of the device position, for example, can be divided into a vehicle inside/outside determination process that determines whether the portable device 2 is present inside the vehicle interior and a lock/unlock area determination process that determines whether the portable device 2 is present inside the lock/unlock area Lx.

Figure 8:
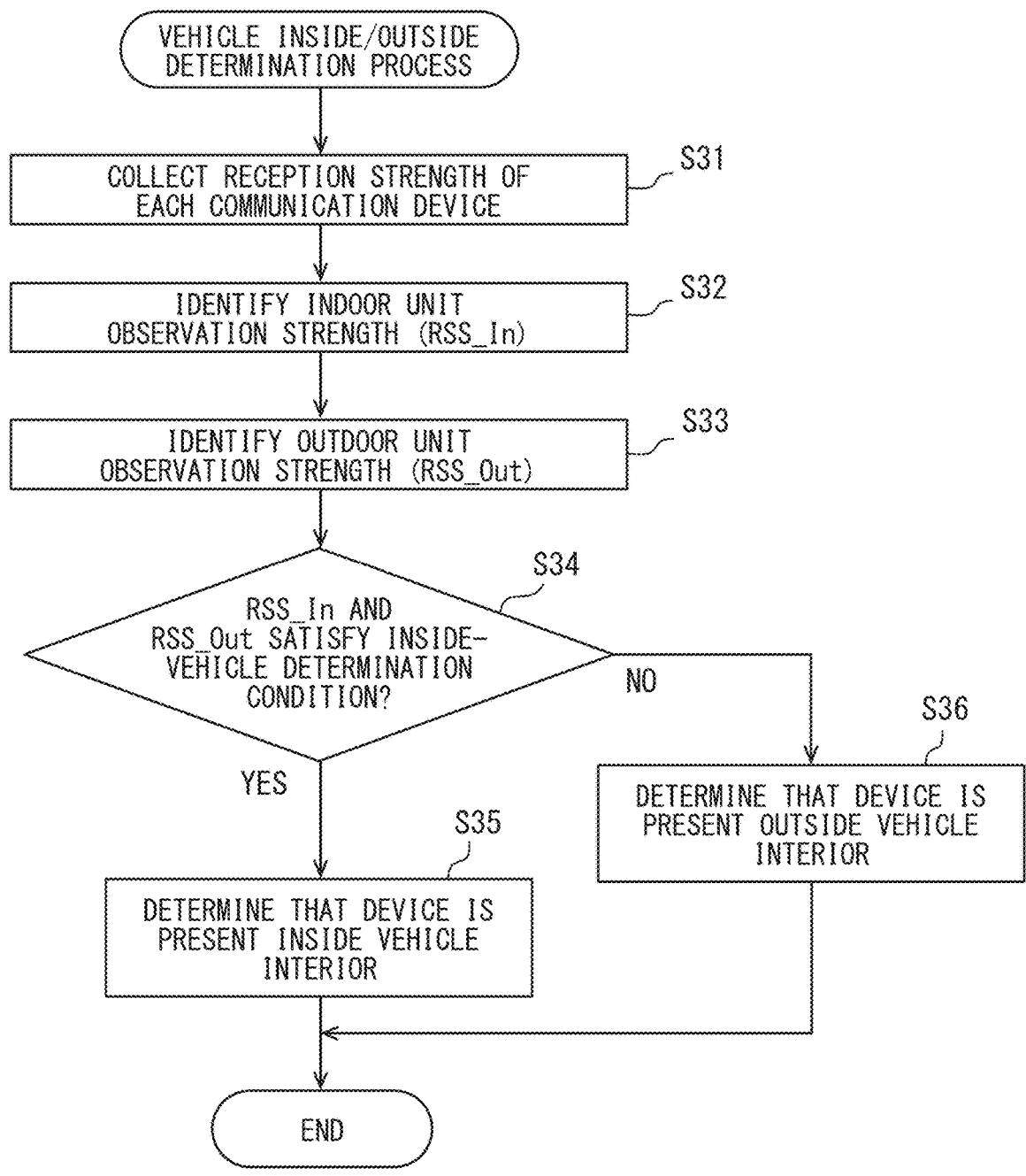
FIG. 8 is a flowchart about a vehicle inside/outside determination process.

First, using FIG. 8, the vehicle inside/outside determination process is described. The vehicle inside/outside determination process includes steps S31 to S36 as one example. The vehicle inside/outside area determination process may be performed triggered by pressing the start button 6. The vehicle inside/outside determination process may be performed triggered by pressing the door button 5 in the state of the vehicle Hv being unlocked as the process for lock. The vehicle inside/outside determination process may be regularly performed at an estimation interval in a case where the vehicle Hv is unlocked or in a state in which the traveling power supply is set to on.

Figure 9:
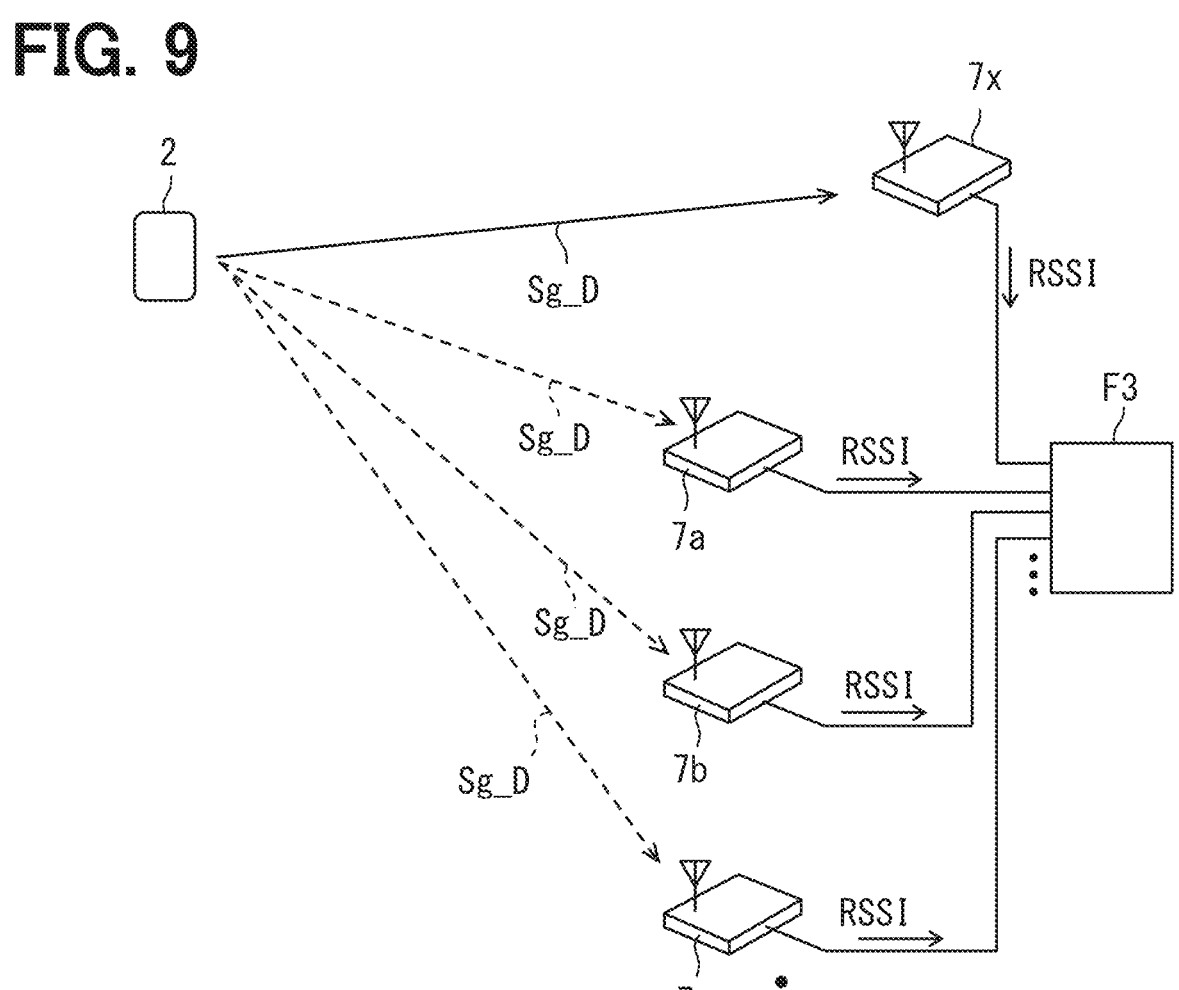
FIG. 9 is a drawing for describing an outline of a sniffing method.

The step S31 is a step of collecting the reception strength of the signal from the portable device 2 from each of the BLE communication devices 7. The reception strength may be collected as needed. To identify the reception strength of the signal from the portable device 2, all of the BLE communication devices 7 are not required to be in the communication connection with the portable device 2. As illustrated in FIG. 9, the BLE communication devices 7 other than the BLE communication device 7x as the representative device may be configured to only observe the reception strength of the signal emitted from the portable device 2. The present disclosure refers to the BLE communication devices 7 other than the representative device as observation devices or sniffing devices. The observation device is equivalent to the BLE communication device 7 that does not transmit the signal but only perform the reception.

Sg_D indicated in FIG. 9 indicates signals transmitted from the portable device 2 to the BLE communication device 7x/the large indefinite number of devices. Sg_D is a data signal after connection establishment. Sg_D is the advertising signal before the connection establishment. Sg_D may be the CW signal. The RSSI means the reception strength.

Since frequency hopping is performed during data communication after the connection establishment, usually, only the BLE communication device 7x in communication connection can capture the from the portable device 2. That is, the observation device cannot observe the signal from the portable device 2. Therefore, the smart ECU 4 delivers the channel information and the device ID acquired from the BLE communication device 7x as the representative device to each of the observation devices as reference information.

Each of the observation devices can recognize that the signal from the portable device 2 can be received by receiving which channel among the many channels usable in the BLE with the channel information shown in the reference information. As a result, the observation device can detect and report the reception strength of the signal from the portable device 2 or the like even without the communication connection.

Thus, the present disclosure refers to a method that causes the representative device to perform the bidirectional communication with the portable device 2 and determines the device position based on the reception situation of the signal transmitted from the portable device 2 to the representative device in the observation device as a sniffing method. The sniffing method allows reducing the number of the BLE communication devices 7 for communication connection with the portable device 2 to one at the minimum, and therefore the power consumption in the portable device 2 can be suppressed. The sniffing method allows collecting an index indicating the distance from the plurality of BLE communication devices 7 to the portable device 2 in parallel, and therefore system responsiveness to the approaching user carrying the portable device 2 can be enhanced. Obviously, as another aspect, each of the BLE communication devices 7 may individually perform the bidirectional communication with the portable device 2 and provide the information, such as the reception strength and the reception phase, to the smart ECU 4.

The step S32 continuous with the step S31 is a step of determining an indoor unit observation strength (RSS_In) based on the reception strength of the signal from the portable device 2 observed in at least one indoor unit within the latest certain period of time. For example, the position estimation unit F3 calculates an individual strength representative value for each of the indoor units as a preparation process to determine the indoor unit observation strength. The position estimation unit F3 employs the maximum value among the individual strength representative value for each of the indoor units as the indoor unit observation strength.

The individual strength representative value is a value representatively indicating the reception strength of the signal from the portable device 2 observed within the latest predetermined time in the single indoor unit. Here, as one example, the individual strength representative value is an average value of the reception strengths within the latest 100 milliseconds or 200 milliseconds. A sampling period of the reception strength to determine one individual strength representative value or the indoor unit observation strength is appropriately changeable. The individual strength representative value is equivalent to a moving average value of the reception strength.

The individual strength representative value may be calculated on one predetermined frequency or may be determined based on the reception strengths at the plurality of frequencies. The individual strength representative value may be calculated at each of the frequencies. The representative value need not be the average value but may be a central value or a maximum value. The representative value may be an average value, a central value, or a maximum value obtained by excluding an outlier from a population. The outlier can be a value separated from double or more than double from a standard deviation of the average value or the central value of the original population. As a method for the outlier determination, various methods, such as the Smirnov-Grubbs test and the Thompson's test, can be employed. The individual strength representative value need not be determined based on observation values at a plurality of time points. The individual strength representative value may be an observation value at any one time point, for example, the latest observation value of the reception strength.

The indoor unit observation strength may be determined by a method other than the above-described method. For example, by a method similar to steps S42 to S42 describe next, among the indoor units, the closest indoor unit as the BLE communication device 7 that is the closest to the portable device 2 may be identified, and the individual strength representative value in the closest indoor unit may be employed as the indoor unit observation strength. The closest indoor unit may be the indoor unit closest to the closest outdoor unit. The processor 41 may refer to the communication device setting data to employ the indoor unit disposed at the position closest to the closest outdoor unit as the closest indoor unit.

The step S32 is a step of determining an outdoor unit observation strength (RSS_Out) based on the reception strength of the signal from the portable device 2 observed in at least one outdoor unit within the latest certain period of time. The determination method of the outdoor unit observation strength itself can be similar to the determination method of the indoor unit observation strength.

In the step S34, whether the indoor unit observation strength (RSS_In) and the outdoor unit observation strength (RSS_Out) meet an inside vehicle interior determination condition is determined. The inside vehicle interior determination condition is a condition to determine that the portable device 2 is present inside the vehicle interior. For example, the position estimation unit F3 determines that the portable device 2 is present inside the vehicle interior when an inside/outside difference value (ΔRSS) obtained by subtracting the outdoor unit observation strength from the indoor unit observation strength is larger than a predetermined difference threshold value (ThGap) (the step S35). That is, when RSS_In − RSS_Out=ΔRSS>ThGap is met, the portable device 2 is determined to be present inside the vehicle interior. When the inside/outside difference value is the difference threshold value or less, that is, when ΔRSS≤ThGap is met, the portable device 2 is determined to be present outside the vehicle interior (the step S36). The difference threshold value is, for example, 5 dB, 10 dB, and 20 dB. The difference threshold value may be 0. The configuration with the difference threshold value of 0 is equivalent to a configuration that determines that the portable device 2 is present inside the vehicle interior based on a fact that the indoor unit observation strength is larger than the outdoor unit observation strength.

Even when ΔRSS≤ThGap is met, the position estimation unit F3 may determine that the portable device 2 is present inside the vehicle interior when the indoor unit observation strength (RSS_In) excesses a predetermined indoor determination value (ThIn). That is, when RSS_In>ThIn is met, irrespective of ΔRSS, the portable device 2 may be determined to be present inside the vehicle interior. The indoor determination value (ThIn) used here is a threshold value for the indoor unit observation strength to determine that the portable device 2 is present inside the vehicle interior. The indoor determination value is designed appropriately by, for example, a test. The indoor determination value is set to a sufficiently large value to ensure suppressing a possibility of erroneous determination. For example, the indoor determination value is set to a value smaller than the maximum value of the indoor unit observation strength that may be observed when a key device Kd is present inside the vehicle interior by about 10 dB.

Even when ΔRSS>ThGap is met, the position estimation unit F3 may determine that the portable device 2 is present outside the vehicle interior when the outdoor unit observation strength (RSS_Out) excesses an outdoor determination value (ThOut). That is, when RSS_Out>ThOut is met, irrespective of ΔRSS, the portable device 2 may be determined to be present outside the vehicle interior. The outdoor determination value (ThOut) used here is a threshold value for the outdoor unit observation strength to determine that the portable device 2 is present outside the vehicle interior. The outdoor determination value is also designed appropriately by, for example, a test. The outdoor determination value is also set to a sufficiently large value to ensure suppressing a possibility of erroneous determination. For example, the outdoor determination value is set to a value smaller than the maximum value of the outdoor unit observation strength that may be observed when the key device Kd is present inside the lock/unlock area Lx by about 10 dB. Even when ΔRSS>ThGap is met, the position estimation unit F3 may determine that the portable device 2 is present outside the vehicle interior based on a fact that a device distance from a predetermined indoor unit has a predetermined value or more. For example, when the distance from the BLE communication device 7x is 3 m or more, even when ΔRSS>ThGap is met, the position estimation unit F3 may determine that the portable device 2 is absent inside the vehicle interior.

Figure 10:
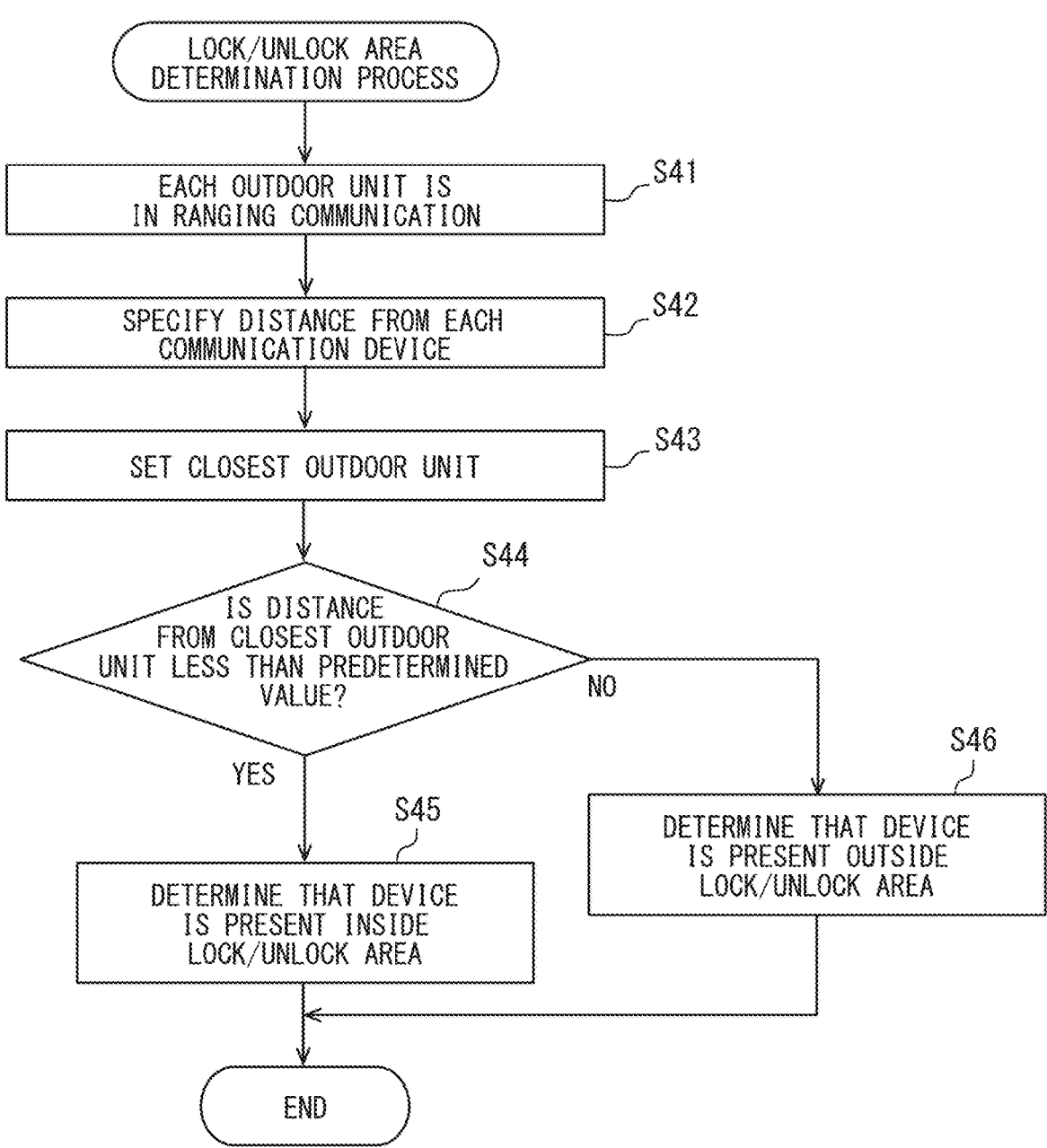
FIG. 10 is a flowchart about a lock/unlock area determination process.

Next, the lock/unlock area determination process is described using FIG. 10. The lock/unlock area determination process includes steps S41 to S46 as one example. A lock/unlock area Lx determination process, for example, may be performed with a condition that, as the result of the vehicle inside/outside determination process described above, the portable device 2 is determined to be absent inside the vehicle interior, in other words, determined to be present outside the vehicle interior. The lock/unlock area Lx determination process may be performed with a condition of the presence of the portable device 2 in communication connection at a predetermined cycle, for example, every 200 milliseconds. The lock/unlock area determination process may be performed triggered by pressing the door button 5.

The step S41 is a step of causing the plurality of outdoor units to perform the communication for ranging with the portable device 2 in sequence. In this embodiment, as the parameter indirectly indicating the ToF, the multiple frequency phase difference is employed. Therefore, the smart ECU 4 causes the plurality of outdoor units to transmit and receive the CW signal with the portable device 2 in sequence to acquire the transmission/reception phase difference at the individual frequency as a calculation premise of the multiple frequency phase difference. The communication control unit F2, for example, causes the BLE communication devices 7a, 7b, 7c to perform the communication for ranging in the order. The communication for ranging by the outdoor units may be performed by temporarily changing the representative device. That is, the step S41 may include the process of changing the representative device in sequence. The CW signal and the signal to measure the RTT is equivalent to the predetermined signal for ranging.

As the calculation method of the transmission/reception phase difference by transmitting and receiving the CW signal, various methods can be employed, and the specific example thereof will be described later. In the BLE, the used frequency is changed over time by the frequency hopping. The processor 41 as the ToF correlation value acquisition unit F23 transmits and receives the CW signal at each of the frequencies to collect the transmission/reception phase difference at the plurality of frequencies for each of the outdoor units. The processor 41 combines the transmission/reception phase difference at of each frequency observed in the identical outdoor unit to calculate the two-frequency phase difference for each combination of the frequencies. The processor 41 performs the calculation process of the two-frequency phase difference for each of the outdoor units to acquire multiple frequency phase difference information in each of the outdoor units.

The step S42 is a step of estimating a distance from each of the outdoor units to the portable device 2 based on the observation value collected in the step S41. The position estimation unit F3 estimates the distance from each of the outdoor units to the portable device 2 based on the multiple frequency phase difference information for each of the outdoor units collected in S41. The estimating process of the device distance may be performed, not by the smart ECU 4, but the communication microcomputer 74 of each of the BLE communication devices 7. The communication microcomputer 74 may have some functions of the position estimation unit F3.

When the two-frequency phase difference is denoted as $\Delta\varphi$, a propagation velocity of the radio wave is denoted as C ($3\times10^8$ m/see), a difference between the two frequencies is denoted as $\Delta f$, and a distance to the portable device 2 is denoted as L, the relationship becomes $L=C\cdot\Delta\varphi/(2\pi\Delta f)$. The two-frequency phase difference by one set of the frequencies may include an error derived from multipath or the like. On the other hand, a degree of the influence differs depending on each of the frequencies. From the circumstance, the processor 41 identifies the device distance based on two or more sets of the two-frequency phase differences. The configuration allows expecting an effect of enhancing ranging accuracy. Obviously, as another embodiment, the position estimation unit F3 may estimate the device distance based on one the two-frequency phase difference.

The position estimation unit F3 may estimate the device distance based on the RTT, not the two-frequency phase difference. The RTT is a time from transmitting the response request signal until receiving the response signal. With the use of the RTT, the device distance for each of the outdoor units can be identified by each of the outdoor units individually transmitting and receiving the signal for ranging to/from the portable device 2. The signal for ranging for ranging using the RTT is not necessary to be the CW signal. As the signal for ranging to acquire the RTT, any configuration including any bit string can be employed. The position estimation unit F3 may estimate the device distance based on the observation value of the RTT at any one frequency or may estimate the device distance based on the average or the central value of the observation values of the RTT at a plurality of frequencies.

In the step S42, the closest outdoor unit as the BLE communication device 7 closest to the portable device 2 is identified among the outdoor units based on the result of the step S42. In the step S44, whether the distance from the closest outdoor unit to the portable device 2 is less than a predetermined value is determined. As the predetermined value used in the determination process in the step S44, the above-described operation distance can be employed.

When the distance from the closest outdoor unit to the portable device 2 is less than the operation distance, the process moves to the step S45, and the portable device 2 is determined to be present inside the lock/unlock area Lx. On the other hand, when the distance from the closest outdoor unit to the portable device 2 is the operation distance or more, the process moves to the step S46, and the portable device 2 is determined to be outside the lock/unlock area Lx. The step S44 can be interpreted as a process of determining whether the minimum value among the distances of each of the plurality of BLE communication devices 7 observed in the step S42 is less than the operation distance.

The position estimation unit F3 may determine that the portable device 2 is present inside the lock/unlock area Lx with the condition of the reception strength in the closest outdoor unit is larger than the indoor unit observation strength, in addition to the distance from the closest outdoor unit to the portable device 2 being less than the operation distance. The indoor unit observation strength used here may be the representative value (for example, the maximum value) of the reception strengths in the plurality of indoor units or may be the reception strength in the indoor unit closest to the closest outdoor unit.

The determination result of the position of the portable device 2 by the position estimation unit F3, namely, the device location information is stored in the RAM 42. The device location information is used by reference by the various programs/functional units. The position estimation unit F3 also sequentially stores the distance information between the closest outdoor unit and the portable device 2 identified in the steps S41 and S42 in the RAM 42 as the device location information. That is, the RAM 42 may store not only whether the portable device 2 is present any of inside the vehicle interior, inside the lock/unlock area Lx, and outside the lock/unlock area Lx, but also the distance information with the closest communication device. The position estimation unit F3 may store not only the closest communication device, but also the device distance from the other BLE communication device in the RAM 42. Each piece of the data may be stored together while a time stamp indicating the acquisition time.

When the BLE communication device 7x receives the signals from the plurality of portable devices 2, the position estimation unit F3 identifies the relative position and the distance with respect to the vehicle Hv for each of the portable devices 2. The position estimation unit F3 may determine whether the device is the smart key by, for example, with the ID of the portable device 2 in communication connection.

When the vehicle Hv is in a parking state, that is, the vehicle Hv is locked and the traveling power supply is off, the position estimation unit F3 may be configured to assume that the portable device 2 is present outside the vehicle interior and perform only the lock/unlock area determination. That is, in the scene for unlock, only the lock/unlock area determination may be performed. When the vehicle is unlocked, the vehicle inside/outside area determination and the lock/unlock area determination may be sequentially performed. The position estimation unit F3 may perform the vehicle inside/outside determination process and the lock/unlock area determination process in the order triggered by pressing the door button 5 in the state where the vehicle Hv is unlocked. The lock is preferably performed after confirming that the portable device 2 is absent inside the vehicle to suppress confinement of the portable device 2 inside the vehicle.

Technical Effects

The configuration is equivalent to a configuration of changing a physical parameter used for the determination in the vehicle inside/outside determination and the lock/unlock area determination. That is, while the processor 41 performs the vehicle inside/outside determination using the reception strengths of the signals from the portable device 2 in the outdoor unit and the indoor unit, the processor 41 performs the lock/unlock area determination using the ToF correlation value, such as the two-frequency phase difference and the RTT.

An element inhibiting the propagation of the radio wave, such as the body of the vehicle, is present between the inside of the vehicle interior and the outside of the vehicle interior. Therefore, according to whether the portable device is present inside the vehicle interior or present outside the vehicle interior, a significant difference may occur between the reception strengths of the signals transmitted from the portable device in the outdoor unit and the indoor unit. However, a structure, such as the body of the vehicle, is absent between the lock/unlock area Lx and the non-operation area. Since the lock/unlock area Lx and the non-operation area are spatially continuous, the significant difference is less likely to occur in the reception strength of the signal from the portable device 2.

The BLE communication uses a high-frequency radio wave, not a radio wave in the Low Frequency (LF) band. Therefore, due to an influence of a multipath and a human body or the like, the reception strength of the signal from the portable device 2 is likely to be unstable. Accordingly, even when the reception strength of the signal from the portable device 2 is strong in the outdoor unit, the portable device 2 is not always present in the lock/unlock area Lx. Similarly, even when the reception strength of the signal from the portable device 2 is small in the outdoor unit, the portable device 2 is not always absent in the lock/unlock area Lx.

With this configuration, whether the portable device 2 is present in the lock/unlock area Lx is determined based on the ToF correlation value determined by the communication of the outdoor unit with the portable device 2, specifically the multiple frequency phase difference and the RTT. The ToF correlation value, such as the transmission/reception phase difference based on the multiple frequency phase difference and the RTT, is less likely to be affected by a human body, and it can be expected to take the value according to the device distance compared with the reception strength. Therefore, whether the portable device 2 is present in the lock/unlock area Lx or present in the non-operation area in outside the vehicle interior can be accurately determined compared with a configuration of simply performing determination by the strength of the reception strength. In the present disclosure, the high-frequency radio wave means a radio wave of 900 MHz or more. The high-frequency radio wave is not limited to the radio wave of 1 GHz or more, but includes a radio wave in a sub-giga band, such as 920 MHz.

On the other hand, the position estimation unit F3 performs the determination whether the portable device 2 is present inside the vehicle interior using the reception strengths in the outdoor unit and the indoor unit. Specifically, whether the portable device 2 is present inside the vehicle interior is determined by the relative comparison between the reception strength in the outdoor unit and the reception strength in the indoor unit and/or a threshold value comparison between the respective reception strengths. As described above, since the element inhibiting the propagation of the radio wave, such as the body of the vehicle, is present between the inside of the vehicle interior and the outside of the vehicle interior, the determination can be performed with desired accuracy using the reception strengths in the outdoor unit and the indoor unit. The reception strength can be simply measured compared with the ToF correlation value, such as the two-frequency phase difference and the RTT. In addition, to measure the reception strength, the bidirectional communication is unnecessary. Accordingly, compared with the configuration of performing the inside/outside determination using the ToF correlation value, a process load in the processor 41, the communication microcomputer 74, or the like can be reduced.

In the embodiment, since the outdoor unit is mounted in the vicinity of the door, the outdoor unit can be used for both the vehicle inside/outside determination and the lock/unlock area determination. The configuration allows reducing the cost compared with the configuration of disposing a communication device for lock/unlock area determination separately from a communication device for vehicle inside/outside determination.

While the embodiments of the present disclosure have been described above, the present disclosure is not limited to the above-described embodiments, and various modifications described later are also included in the technical scope of the present disclosure. Except for the following, various changes can be made within the scope not departing from the gist. For example, the following various supplements and modifications can be embodied by appropriate combination within the scope of not causing technical confliction. The identical reference numerals are given to members having the identical functions as the members described above, and the description thereof will be omitted in some cases. When only a part of the configuration is mentioned, the above-described description is applicable to another part.

(Adjustment of Transmission Strength According to Device Position)

The communication control unit F2 may change a strength of the radio wave output from the BLE communication device 7 according to the distance from the vehicle Hv to the portable device 2, in other words, the device position. For example, when the portable device 2 is determined to be present within a predetermined distance from the vehicle Hv, the transmission electric power in the BLE communication device 7 may be changed to a suppression level lower than a predetermined standard level by a predetermined amount. The configuration allows reducing the power consumption in the on-board system 1.

Figure 11:
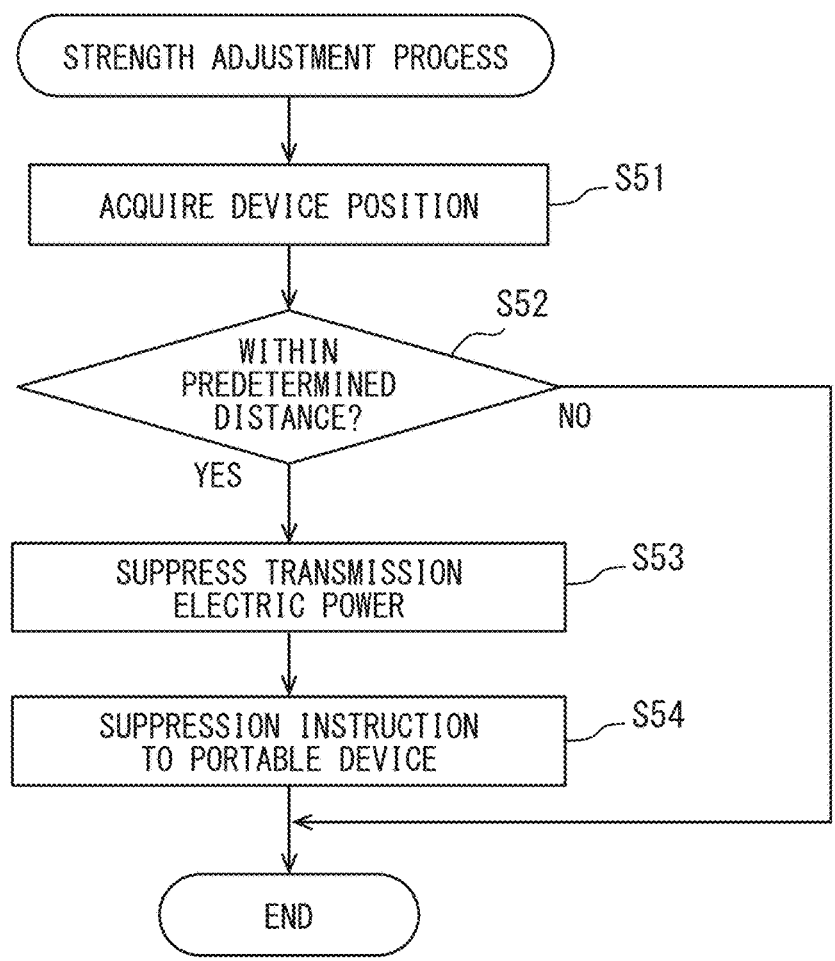
FIG. 11 is a flowchart about a strength adjustment process.

FIG. 11 illustrates the operation example of the processor 41 corresponding to the technical idea. The flowchart depicted in FIG. 11 may be sequentially performed with the condition of the communication connection with the portable device 2. First, the processor 41, for example, acquires the device position as the result of the lock/unlock area determination process (a step S51). That is, the processor 41 acquires the device distance at each of the outdoor units. The processor 41 decreases the transmission electric power in each of the outdoor units from the standard level to the suppression level (a step S52) based on the presence of the outdoor unit with the device distance of less than the predetermined value (YES in a step S52). The processor 41 transmits a predetermined electric power suppression instruction signal to the portable device 2 via the BLE communication device 7x (a step S54). The electric power suppression instruction signal is an instruction signal to suppress the transmission electric power by a predetermined amount.

A threshold value used in the step S52 can be, for example, 2 m and 5 m. The configuration of performing the processes of the steps S51 and S52 allows reducing the power consumption of the on-board system 1. The configuration that performs the step S54 with the condition that the portable device 2 is present around the vehicle Hv also allows suppressing the power consumption in the portable device 2.

Figure 12:
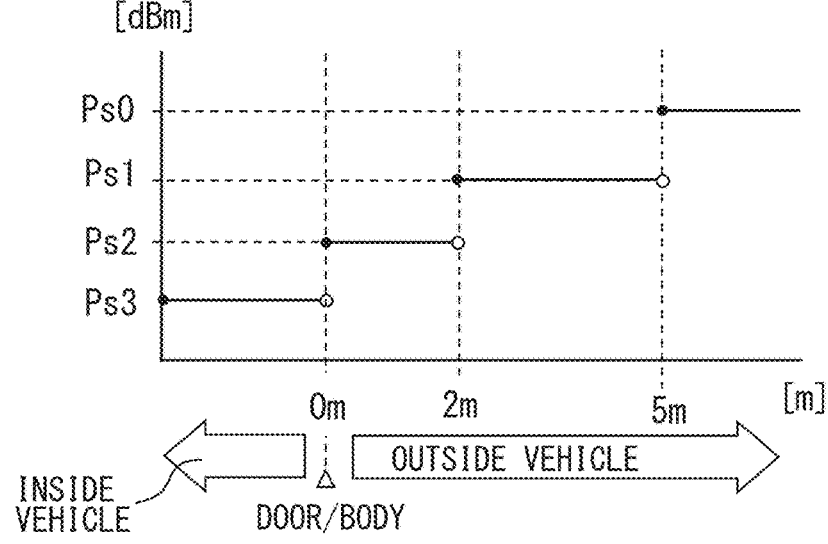
FIG. 12 is a drawing illustrating an example of an adjustment aspect of transmission electric power according to a device position.

The transmission electric power may be adjusted in multiple stages according to the device position as illustrated in FIG. 12, for example. While FIG. 12 illustrates an aspect of changing the transmission electric power in a stepped shape, the transmission electric power may be changed to a curved line shape or a straight line shape according to the distance from the closest outdoor unit. Ps0 indicated in FIG. 12 is equivalent to the standard level, and Ps1 and Ps2 are equivalent to the suppression levels. Ps0 to Ps2 have a relationship: Ps0>Ps1>Ps2.

For example, when the portable device 2 is away from the vehicle Hv by 5 m or more, the communication control unit F2 applies the standard level (Ps0), and when the portable device 2 is present at the position of 2 m or more to less than 5 m, the communication control unit F2 applies a first suppression level (Ps1). As the distance from the vehicle Hv to the portable device 2, the minimum value of the device distance with reference to each of the outdoor units can be employed. When the portable device 2 is present within 2 m from the vehicle Hv outside the vehicle, a second suppression level (Ps2) is applied. When the portable device 2 is present inside the vehicle interior, the second suppression level (Ps2) is applied. As illustrated in FIG. 12, the configuration that performs fine electric power control according to the device position allows expecting further power saving effect. In the state of suppressing the transmission electric power of the BLE communication device 7, a possibility of response of the portable device 2 present at a distant place different from the portable device 2 present around the vehicle can be reduced.

When the portable device 2 is determined to be present outside the vehicle interior, the processor 41 may suppress the transmission electric power of the BLE signal in the portable device 2 according to the position of the portable device 2. The amount of suppression may be increased as the portable device 2 is close as illustrated in FIG. 12 as an example. The suppression of the transmission electric power in the portable device 2 may be achieved by transmission of the electric power suppression instruction signal. The electric power suppression instruction signal may include the amount of suppression with respect to the standard level or a target level. When the transmission electric power of the portable device 2 is suppressed, the position estimation unit F3 may correct the threshold value or the observation value of the reception strength regarding the vehicle inside/outside determination according to the amount of suppression of the transmission electric power and perform the vehicle inside/outside determination.

Besides, the communication control unit F2 may change a communication rate/communication interval according to the device position. For example, when the portable device 2 is present within 5 m from the vehicle Hv, communication is performed at a predetermined standard interval. On the other hand, when the portable device 2 is absent within 5 m from the vehicle Hv, communication is performed at a power saving interval longer than the standard interval by a predetermined amount. When the standard interval is, for example, 25 milliseconds, 50 milliseconds, and 100 milliseconds, the power saving interval can be, for example, 200 milliseconds and 400 milliseconds. The power saving interval may be, for example, double the standard interval. Since the configuration allows reducing the communication rate with the portable device 2, the power consumption can be suppressed in both the portable device 2 and the on-board system 1.

(Modification of Lock/Unlock Area Determination Process)

As viewed from the vehicle Hv, when the portable device 2 is present at a rear side of the user and a reflection object, such as another vehicle, is present nearby, a strength of the reflected wave may be higher than a strength of a direct wave and a distance via the reflection object may be calculated. When a ranging value in the outdoor unit is a predetermined value or more, the portable device 2 is determined to be in outside the lock/unlock area Lx. That is, under the condition where the reflected wave has the strength larger than that of the direct wave by the predetermined value or more, in spite of the portable device 2 being present inside the lock/unlock area Lx, the portable device 2 may be erroneously determined to be present outside the lock/unlock area Lx. As viewed from the vehicle Hv, the case where the portable device 2 is present at the rear side of the user includes, for example, the portable device 2 is housed in a rear pocket of trousers and a backpack.

In view of the circumstance, the position estimation unit F3 may use not only the outdoor unit but also the ranging value based on the ToF correlation value in the indoor unit together to determine whether the portable device 2 is present in the lock/unlock area Lx. For example, when the device distance from the predetermined indoor unit is the predetermined value or less, the position estimation unit F3 may determine that the portable device 2 is present inside the lock/unlock area Lx even when the device distance from the outdoor unit is the predetermined value or more. The indoor unit to measure the distance from the portable device 2 may be all or may be the indoor unit closest to the closest outdoor unit. The portable device 2 may be determined to be present in the lock/unlock area Lx based on a fact that the ranging value from a center device as the indoor unit disposed at the center of the ceiling portion of the inside of the vehicle interior and/or a center console is less than a predetermined value (for example, 2 m).

The smart ECU 4 does not always use the ranging value of the indoor unit but may perform the lock/unlock area determination using the ranging value of the indoor unit only when an operation of a predetermined pattern by the user via the door button 5 is detected. Here, the assumed operation of the predetermined pattern means, for example, the operation pattern that may be performed by the user when the system does not response in spite of the portable device 2 being in the lock/unlock area Lx, for example, when the door button 5 is repeatedly pressed.

(Modification of Mounting Pattern of BLE Communication Device)

Figure 13:
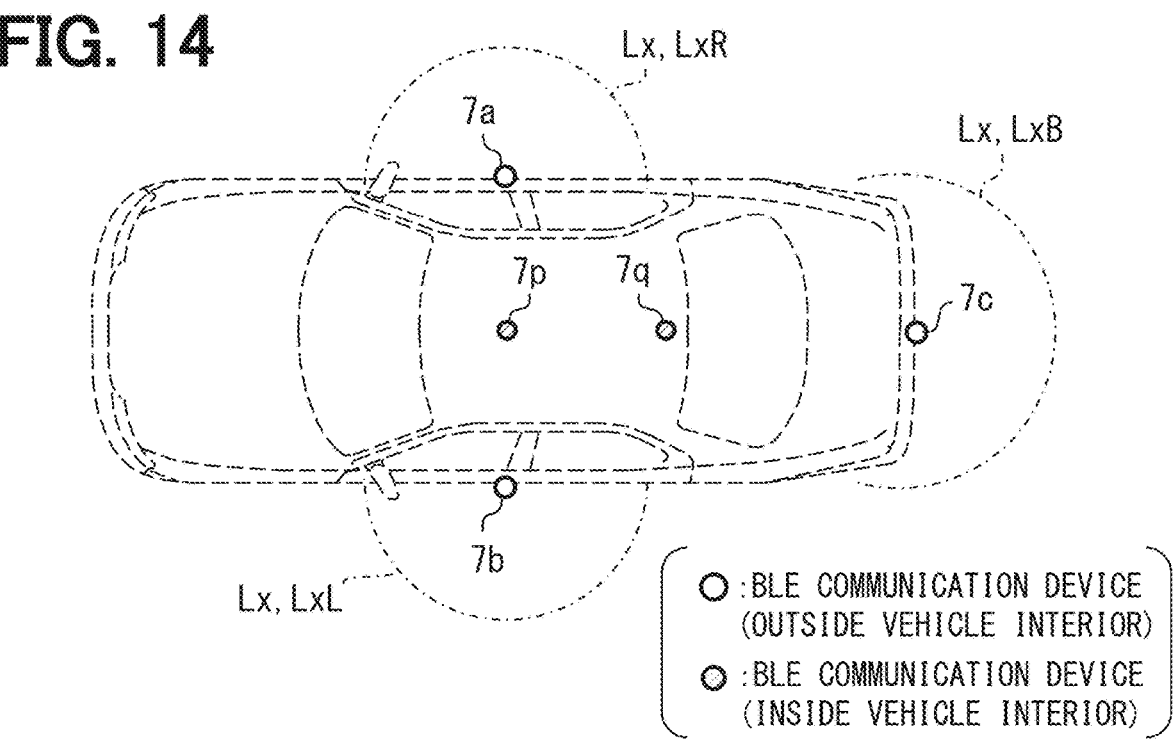
FIG. 13 is a drawing illustrating a modification of a mounting pattern of the BLE communication device.

The number of the mounted BLE communication devices 7 in the on-board system 1 and the mounting positions may be an aspect illustrated in FIG. 13. That is, the indoor unit may be only one BLE communication device 7p. In this case, the BLE communication device 7p may be disposed on, for example, a floor portion between the driver's seat and the front passenger seat and the center console such that the radio wave is less likely to leak to the outside of the vehicle interior, for example. Alternatively, the BLE communication device 7p may be disposed on, for example, the center portion of the ceiling portion on inside the vehicle, an overhead console, and an upper end portion of a rear glass such that the signal from the portable device 2 present outside the vehicle interior is likely to be received.

The BLE communication devices 7 as the indoor units may be the two BLE communication devices 7p, 7q as illustrated in FIG. 14. In this case, the BLE communication device 7p may be disposed on the center console and the instrument panel, for example. The BLE communication device 7q may be disposed, for example, on the upper end portion of the rear glass.

Figure 15:
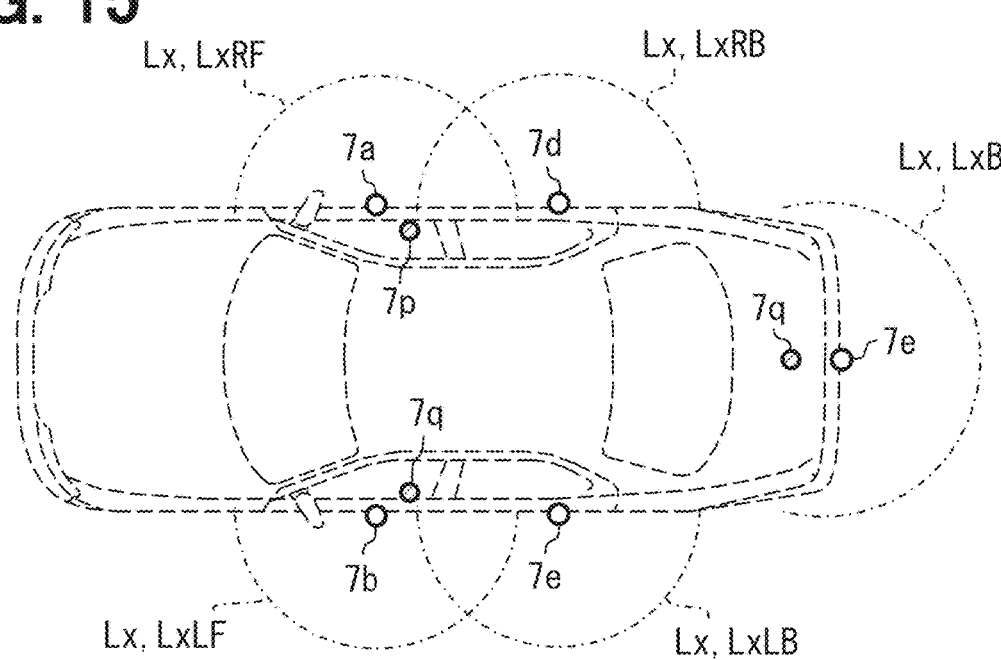
FIG. 15 is a drawing illustrating a modification of a mounting pattern of the BLE communication device.

Similar to the embodiment, FIG. 13 and FIG. 14 illustrate a configuration in which the BLE communication devices 7a to 7c are disposed at two positions in the vicinity of the right and left pillar B and in the vicinity of the trunk door. Obviously, the number of disposed outdoor units or the like is not limited thereto. For example, as illustrated in FIG. 15, as the BLE communication devices 7 as the outdoor units, the BLE communication devices 7a and 7b and 7d and 7e as the outdoor units may be disposed so as to form the individual lock/unlock areas Lx at peripheral areas of the right-side front door, the left front door, the right rear door, and the left rear door. For example, the BLE communication device 7a is disposed on the external door handle at the right front door or the outdoor side surface of the door-side pillar B. The BLE communication device 7b is disposed on the external door handle at the left front door or the outdoor side surface of the door-side pillar B. The BLE communication device 7d is disposed on the external door handle at the right rear door or the pillar C. The BLE communication device 7e is disposed on the external door handle at the right rear door or the pillar C. The right rear door and the left rear door mean the doors for the rear seat disposed right and left of the vehicle Hv. The configuration is equivalent to a configuration in which the outdoor unit is disposed for each of the doors included in the vehicle Hv.

Figure 16:
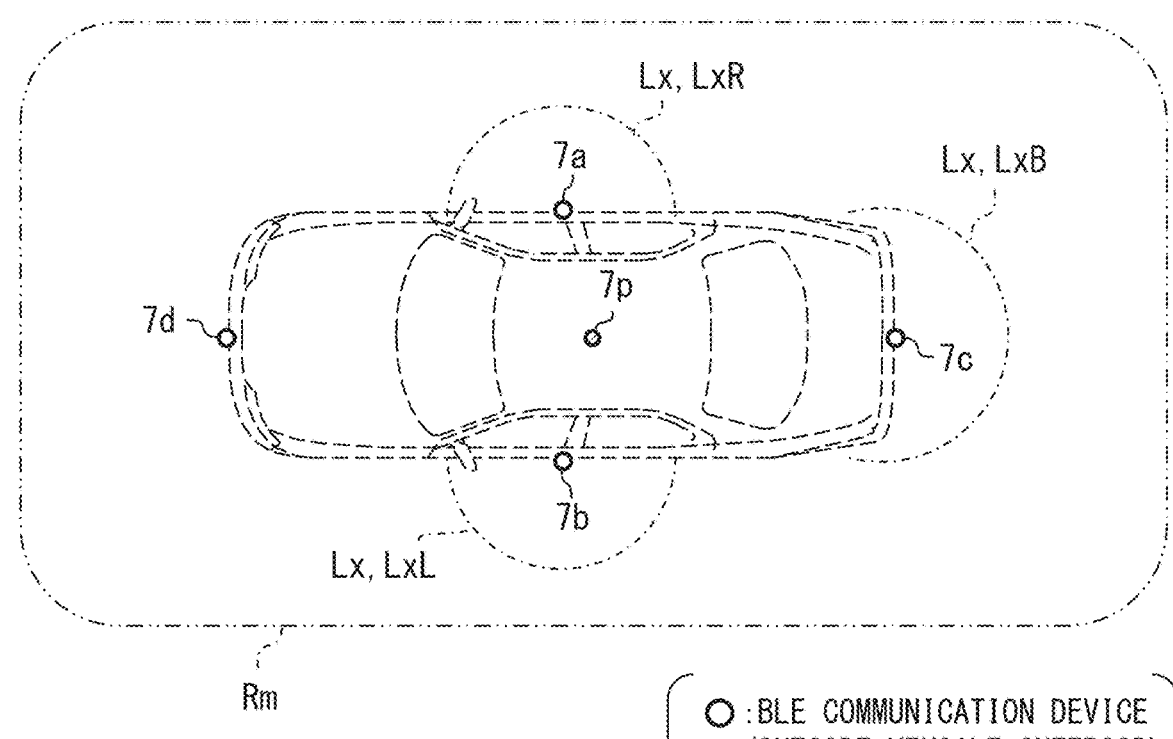
FIG. 16 is a drawing illustrating a modification of a mounting pattern of the BLE communication device.

The mounting pattern illustrated in FIG. 15 allows individually identifying the user who gets on from each of the doors and eventually identifying a seated person for each seat based on the transmission source information of the signal from the portable device 2 received by the outdoor unit at each of the doors. As a result, the smart ECU 4 can perform services, such as adjustment of the seat position according to the seated person, auto-configuration change of an air conditioning, playback of a video inside the vehicle, and lighting of a welcome illumination. As illustrated in FIG. 16, the BLE communication device 7 may also be disposed on a front end portion of the vehicle. The BLE communication device 7d illustrated in FIG. 16 is disposed at a center portion of the front bumper in the vehicle width direction or in the vicinity of the emblem.

Figure 17:
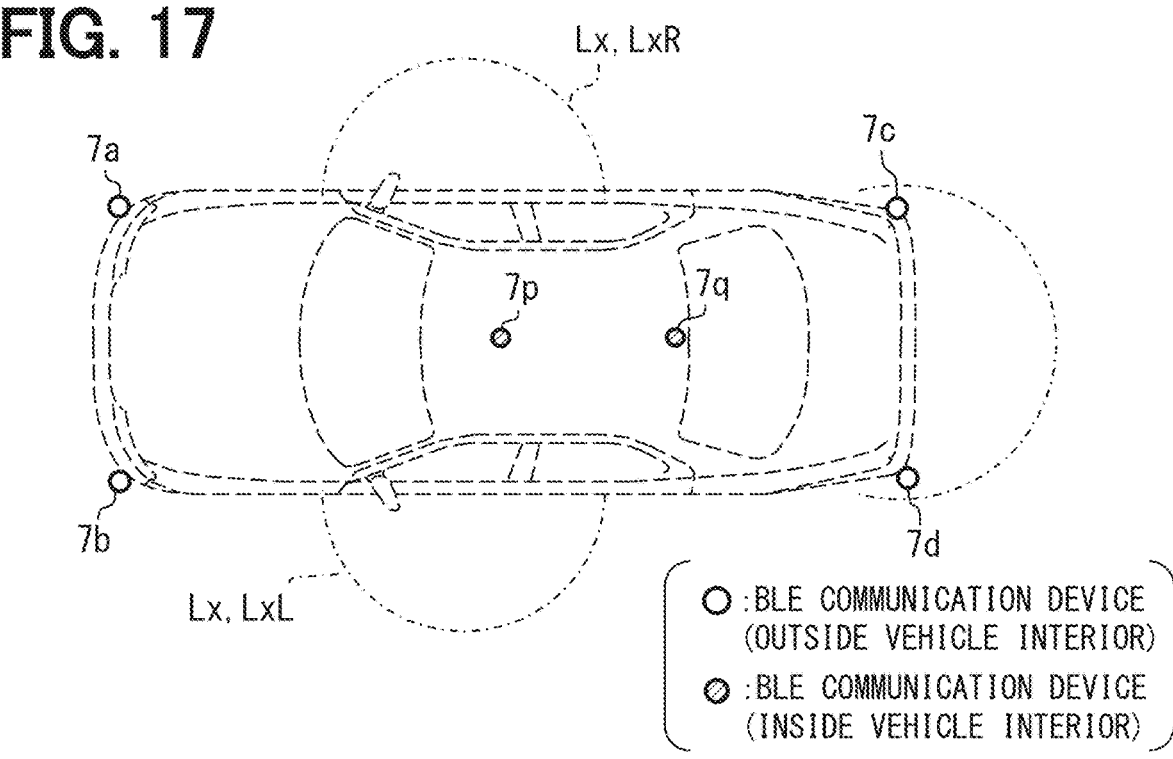
FIG. 17 is a drawing illustrating a modification of a mounting pattern of the BLE communication device.

As illustrated in FIG. 17, the BLE communication devices 7a to 7d as the outdoor units may be disposed on front, rear, right, and left corner portions. For example, the BLE communication devices 7a, 7b are built into the right and left corner portions of the front bumper, and the BLE communication devices 7c and 7d are disposed at right and left corner portions of the rear bumper.

(Application to Remote Operation)

The smart ECU 4 may perform position determination for a remote parking function that causes the vehicle Hv to park by the remote operation using the portable device 2. A regulation or the like specifies that remote parking is usable with a condition of presence of the user within a remote parking area Rm within a predetermined distance from the vehicle Hv. An ECU providing an automatic parking function causes the vehicle to autonomously travel to a target parking position with a condition the smart ECU 4 determines that the user is present within the remote parking area Rm and the user presses an automatic parking button of the portable device 2.

The remote parking area Rm may be, set, for example, within 5 m from the vehicle Hv. Obviously, a distance to specify the size of the remote parking area may be, for example, 6 m and 10 m. The size of the remote parking area Rm is set so as to be compliant to a legislation of a region/country where the vehicle Hv is used.

For example, as illustrated in FIG. 16 or FIG. 17, when the outdoor units are disposed at the front, rear, right, and left of the vehicle body so as to see through all orientations of the vehicle Hv, using these four outdoor units, the processor 41 determines whether the portable device 2 is present inside the remote parking area Rm using the four outdoor units. Specifically, each of the outdoor units is caused to perform ranging communication with the portable device 2 to acquire the device distance from each of the outdoor units. When the minimum value of the device distances is a predetermined distance (for example, 5 m) or less, the portable device 2 may be determined to be present inside the remote parking area Rm. A control signal from the portable device 2 regarding the remote parking is enabled with a condition of the determination that the portable device 2 is present inside the remote parking area Rm. Thus, the position estimation unit F3 may determine whether the portable device 2 is present in the remote parking area Rm. The remote parking area Rm is also equivalent to one kind of the outdoor operation area.

(Automatic Change of Determination Algorithm According to Mounting Pattern of Communication Device)

The processor 41, for example, may refer to communication device setting data in the storage 43 to acquire the mounting pattern of the BLE communication device 7 and automatically switch the algorithm for vehicle inside/outside determination and the lock/unlock area determination so as to correspond to the mounting pattern. The determination algorithm for each mounting pattern only need to be preliminarily prepared. The mounting patterns of the BLE communication devices 7 include the numbers of the outdoor units and the indoor units and the mounting positions of the respective outdoor units and indoor units.

For example, regarding the lock/unlock area determination, as illustrated in FIG. 2, FIG. 13, FIG. 14, and FIG. 15, when the outdoor unit is disposed for each of the lock/unlock areas Lx, the user is determined to be present in the direction where the closest outdoor unit is disposed. The portable device 2 is determined to be present in the lock/unlock area Lx corresponding to the outdoor unit where the device distance is less than a predetermined value.

Meanwhile, as illustrated in FIG. 17, when the outdoor units are disposed at four corners of the vehicle body, the distance from each of the outdoor units to the portable device 2 is calculated to identify the closest outdoor unit and a second closest outdoor unit. The second closest outdoor unit means the outdoor unit second closest to the portable device 2. The user is determined to be present in the direction where an outer surface portion continuous with both the closest outdoor unit and the second closest outdoor unit is present. For example, when the closest outdoor unit is the BLE communication device 7a and the second closest outdoor unit is the BLE communication device 7c, the portable device 2 and the user are determined to be present on the vehicle right side. The position estimation unit F3 calculates the device position by two-point measurement based on the device distances from the closest communication device and the second closest outdoor unit, and when the device position is inside the lock/unlock area Lx, the portable device 2 is determined to be present in the lock/unlock area Lx.

Regarding the vehicle inside/outside determination as well, the details may be changed according to the numbers of mounted indoor units and outdoor units. For example, as illustrated in FIG. 2 and FIG. 15, when the three or more indoor units are present, a maximum value of the reception strengths of the signals from the portable device 2 observed in the respective plurality of indoor units is employed as an indoor unit observation strength (RSS_In). When there is only one indoor unit as illustrated in FIG. 13, an individual strength representative value determined based on the reception strength observed in the indoor unit is directly employed as the indoor unit observation strength. As illustrated in FIG. 14, when there are the two indoor units, among the individual strength representative values observed in the indoor units, the large one is employed as the indoor unit observation strength.

The BLE communication device 7x built into the smart ECU 4 may be used as the indoor unit. Whether the BLE communication device 7x is used as the indoor unit only needs to be determined according to the mounting position. Whether the BLE communication device 7x is usable as the indoor unit may be registered in the communication device setting data in advance using a flag or the like.

It is assumed that a receiving sensitivity is different depending on each of the BLE communication devices 7 according to a configuration of the antenna and an environment of a mounted destination. Accordingly, the reception strength of each of the BLE communication devices 7 may be used for various determinations after a correction value (offset) according to the antenna property or the installation position is added.

Information on the positions and the number of the BLE communication devices 7 mounted on the vehicle Hv may be acquired from a body ECU or the like via the in-vehicle network Nw. The entity of holding the data indicating the mounting pattern of the BLE communication device 7 in the vehicle Hv need not be the smart ECU 4. The data indicating the mounting pattern of the BLE communication device 7 may be input from an external server and a predetermined dedicated tool used by a dealer.

Besides, the processor 41 may flag an applicable service among preliminarily prepared services according to the mounting pattern of the BLE communication devices 7 to the vehicle Hv. For example, the flag value is set to 1 for the service that can be performed in the current mounting pattern, and the flag value is set to 0 for the service that cannot be performed in the current mounting pattern. Examples of the kind of the service include remote parking and application of personal setting to the rear seat.

(Supplement of Lock/Unlock Area Determination Process)

Figure 18:
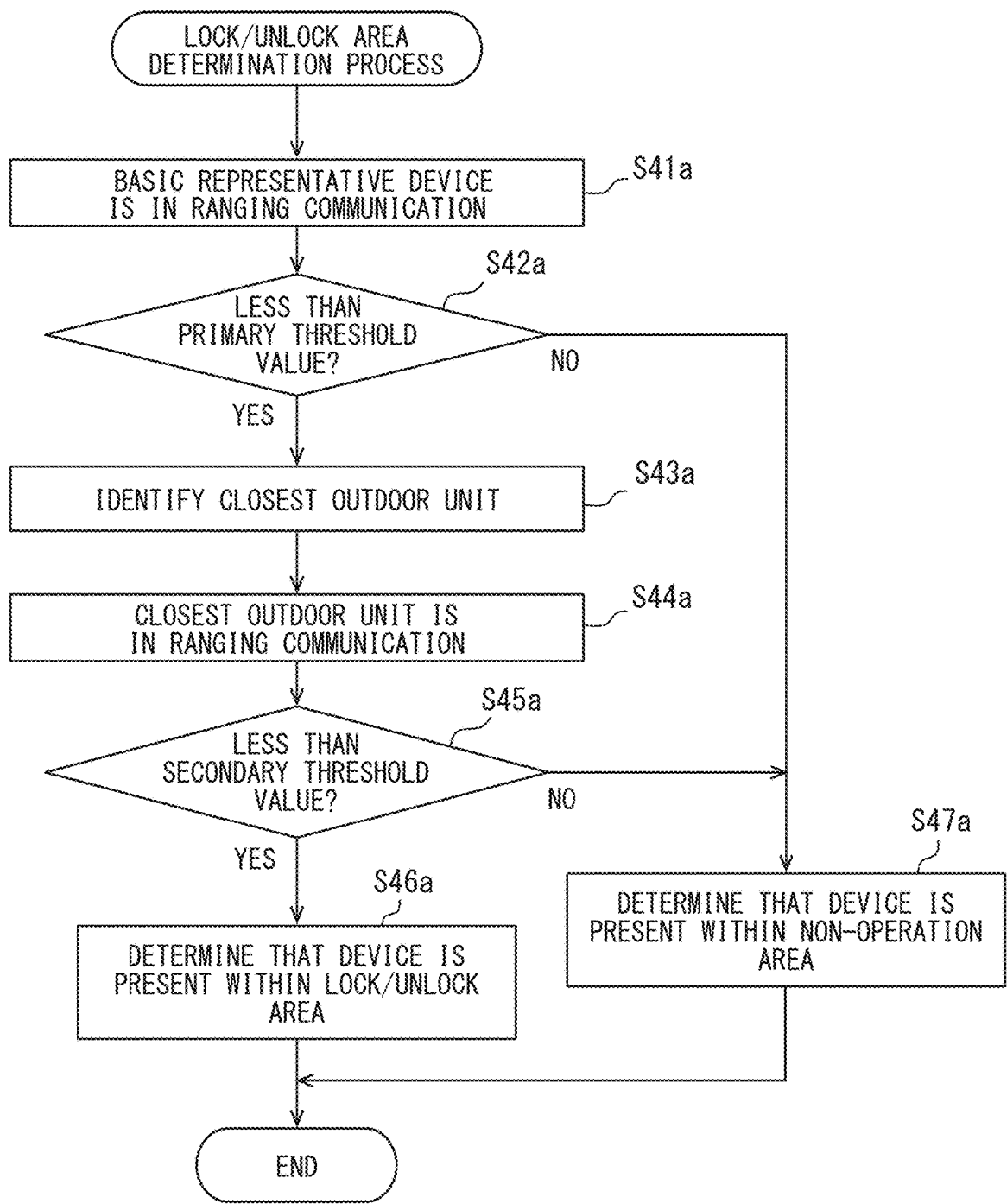
FIG. 18 is a flowchart about a modification of the lock/unlock area determination process.

The lock/unlock area determination process may be performed in the procedure depicted in FIG. 18. The flowchart depicted in FIG. 18 includes steps S41a to S47a. The flowchart depicted in FIG. 18 may be performed as an alternative process of FIG. 10.

First, in the step S41a, the communication control unit F2 causes a basic representative device to perform the communication for ranging to acquire the ToF correlation value. The basic representative device here means the BLE communication device 7 in charge of data communication with the portable device 2 in a basic state. Here, the BLE communication device 7x is equivalent to the basic representative device. When the BLE communication device 7 disposed at the position where not only inside the vehicle interior but also outside the vehicle interior can be seen through, such as the upper end portion of the rear glass, an upper end portion of the windshield, and the center portion of the ceiling portion of inside the vehicle, is present, the communication device may be set as the basic representative device.

In the step S42a, the position estimation unit F3 identifies the distance to the portable device 2 based on the ToF correlation value acquired in the step S41a. Whether the distance between the basic representative device and the portable device 2 is less than a predetermined primary threshold value is determined. When the distance between the basic representative device and the portable device 2 is less than the predetermined primary threshold value, the processor 41 identifies the closest outdoor unit based on the reception strength of the signal from the portable device 2 at each of the outdoor units as the step S43a. For example, among the outdoor units, the one having the largest reception strength from the portable device 2 is selected as the closest outdoor unit. Besides, when the basic representative device includes the array antenna and is configured to allow estimating the arrival direction of the signal from the portable device 2 as the device direction, the processor 41 may select the outdoor unit disposed in the device direction as the closest outdoor unit.

On the other hand, when the distance between the basic representative device and the portable device 2 is the predetermined primary threshold value or more, the portable device 2 is determined to be present outside the lock/unlock area Lx, that is, the non-operation area (the step S47a). The primary threshold value used here is a parameter to distinguish whether there is a possibility of the presence of the portable device 2 inside the lock/unlock area Lx. The primary threshold value is set to a value found by adding the predetermined offset amount to the operation distance. The offset amount is set according to the distance from the basic representative device to the lock/unlock area Lx. For example, the primary threshold value may be set to a length found by adding 1 m or 2 m to the operation distance. For example, the primary threshold value may be set to 4 m and 5 m.

In the step S44a, the communication control unit F2 causes the closest outdoor unit determined in the step S42a to perform the communication for ranging and acquires the ToF correlation value with the closest outdoor unit as an observation point. The step may inherent a step of setting the closest outdoor unit as a temporal representative device.

In the step S45a, the position estimation unit F3 identifies the distance from the closest outdoor unit to the portable device 2 based on the ToF correlation value acquired in the step S44a. Whether the distance between the closest outdoor unit and the portable device 2 is less than a predetermined secondary threshold value is determined. The secondary threshold value is a parameter to determine whether the portable device 2 is present inside the lock/unlock area Lx and set to a value same as the operation distance.

When the distance between the closest outdoor unit and the portable device 2 is less than the predetermined secondary threshold value, the position estimation unit F3 determines that the portable device 2 is present inside the lock/unlock area Lx corresponding to the closest outdoor unit (the step S46a). For example, when the closest outdoor unit is the BLE communication device 7a, the portable device 2 is determined to be present in the right side area LxR. On the other hand, when the distance between the closest outdoor unit and the portable device 2 is the predetermined secondary threshold value or more, the portable device 2 is determined to be still present in the non-operation area (the step S47a).

The above-described method allows suppressing the number of communication devices that perform the ranging communication more than that of the above-described embodiment. In other words, the rate of performing the communication for ranging can be reduced. Therefore, the power consumption in the portable device 2 and the on-board system 1 can be reduced. When the device distance with reference to the basic representative device is the primary threshold value or more, the outdoor unit is not caused to perform the communication for ranging. Thus, compared with the above-described embodiment, the power consumption in the on-board system 1 and the portable device 2 can be suppressed. The technical idea described here is also applicable the lock/unlock area determination in the step S41 or the like. For example, when the device distance starting from the basic representative device of less than the primary threshold value is detected, the communication control unit F2 may cause each of the outdoor units to perform the communication for ranging in sequence.

(Supplement of Position Determination Method)

As the algorithm that determines whether the portable device 2 is present inside the vehicle interior, except for the above-described algorithm, various algorithms can be employed. For example, the position estimation unit F3 may determine that the portable device 2 is present inside the vehicle interior based on a fact that the indoor unit observation strength is the indoor determination value or more and the outdoor unit observation strength is less than the outdoor determination value. When the indoor unit observation strength is the indoor determination value or more and the outdoor unit observation strength is less than the outdoor determination value, the determination algorithm determines that the portable device 2 is present inside the vehicle interior. Even when the indoor unit observation strength is the indoor determination value or more, when the outdoor unit observation strength is the outdoor determination value or more and when the indoor unit observation strength is less than the indoor determination value, the portable device 2 may be determined to be present outside the vehicle interior.

The position estimation unit F3 may be configured to determine whether the portable device 2 is present inside the vehicle interior using two threshold values for the indoor unit observation strength, that is, a high level threshold value and a low level threshold value. The high level threshold value is a threshold value to determine that the portable device 2 enters from the outside of the vehicle interior to the inside of the vehicle interior based on the indoor unit observation strength. The low level threshold value is a threshold value to determine that the portable device 2 exits from the inside of the vehicle interior to the outside of the vehicle interior based on the indoor unit observation strength. The high level threshold value may be the same as the above-described indoor determination value. The low level threshold value is preferably set to be a value lower than the high level threshold value by 10 dB or more.

In the configuration, when the indoor unit observation strength once becomes the high level threshold value or more, the position estimation unit F3 maintains the determination that the portable device 2 is present inside the vehicle interior until the indoor unit observation strength becomes less than the low level threshold value. When the indoor unit observation strength once becomes less than the low level threshold value, the position estimation unit F3 maintains the determination that the portable device 2 is present outside the vehicle interior until the indoor unit observation strength becomes the high level threshold value or more. In this case, the outdoor unit observation strength is not used. Therefore, the process of calculating the outdoor unit observation strength can be omitted.

One example of the determination method whether the portable device 2 is present inside the vehicle interior has been described. For whether the portable device 2 is present in the lock/unlock area Lx, various determination algorithms are applicable similarly to the determination whether the portable device 2 is present inside the vehicle interior. As the determination method of the portable device 2, for example, the methods disclosed in JP 2020-85487 A, JP 2020-26996 A (corresponding to US 2021/0168563 A), JP 2020-26998 A (corresponding to US 2021/0168563 A), JP 2019-158765 A (corresponding to US 2020/0233072 A), and JP 2019-73960 A (corresponding to US 2020/0233072 A) can be incorporated by reference.

When the position of the portable device 2 is regularly determined, the processor 41 may use the latest determination result and the past determination result together to finally determine the current position. For example, when the past two determination results are outside the lock/unlock area Lx and the latest determination result is inside the lock/unlock area Lx, the final determination of the current position of the portable device 2 is outside the lock/unlock area Lx. On the other hand, for example, when the last but one determination result is outside the lock/unlock area Lx and the previous and latest determination results are inside the lock/unlock area Lx, the final determination of the current position of the portable device 2 is inside the lock/unlock area Lx. The configuration is equivalent to a configuration that determines the final device position by performing decision by a majority/averaging with the past determination result and the latest determination result as the population.

The configuration that determines the final current position using the latest determination result and the previous determination result together allows reducing a possibility of erroneously determining the device position due to an instantaneous noise or the like. The technical idea is, not only the configuration that determines the device position in units of areas, but also applicable to a case where determination is performed with a positional coordinate as separately described later. In a configuration that calculates the relative position coordinate of the portable device 2 to the vehicle Hv, the final positional coordinate may be fixed by, for example, weighting and averaging the predetermined number of past estimation results and the latest estimation result.

The position estimation unit F3 may be configured to calculate a relative two-dimensional/two-dimensional positional coordinate of the portable device 2 to the vehicle Hv. For example, the position estimation unit F3 may identify the position of the portable device 2 by the RSSI method using the reception strength of the signal from the portable device 2. The RSSI method is a method that estimates the distance from each of the BLE communication devices 7 to the portable device 2 using a property, such as an attenuation of an electrical field strength of the wireless signal according to a propagation distance, and estimates the device position based on the distance from each of the BLE communication devices 7.

The position estimation unit F3 converts reception strength information of the signal from the portable device 2 observed in each of the BLE communication devices 7 into distance information and generates distance information from each of the BLE communication devices 7 to the portable device 2. By integrating the distance information from each of the BLE communication devices 7 to the portable device 2, the position of the portable device 2 is calculated. For example, the position estimation unit F3 identifies the position of the portable device 2 with respect to a reference point of the vehicle Hv by three-point survey or a triangulation principle based on the distances calculated from the respective reception strengths observed in the two or more BLE communication devices 7 and the mounting positions of the BLE communication devices 7. The conversion of the reception strength into the distance information can be achieved using a model formula that the reception strength is attenuated to a square of the distance or inverse proportion to the square. The position of the portable device 2 with respect to the vehicle Hv can be expressed as a point on a vehicle coordinate system.

As another aspect, the position estimation unit F3 may identify the position of the portable device 2 with respect to the vehicle Hv using an angle of arrival (AoA) method using an arrival angle of the radio wave. The position of the portable device 2 with respect to the vehicle Hv may be identified using the distance information with the ToF. For example, the position estimation unit F3 may combine the device distances from the two or more BLE communication devices 7 determined based on the ToF correlation value to identify the detailed position of the portable device 2. Besides, using a time difference of arrival (TDOA) method of performing localization using an arrival time difference of the radio wave, the position of the portable device 2 with respect to the vehicle Hv may be identified.

Figure 19:
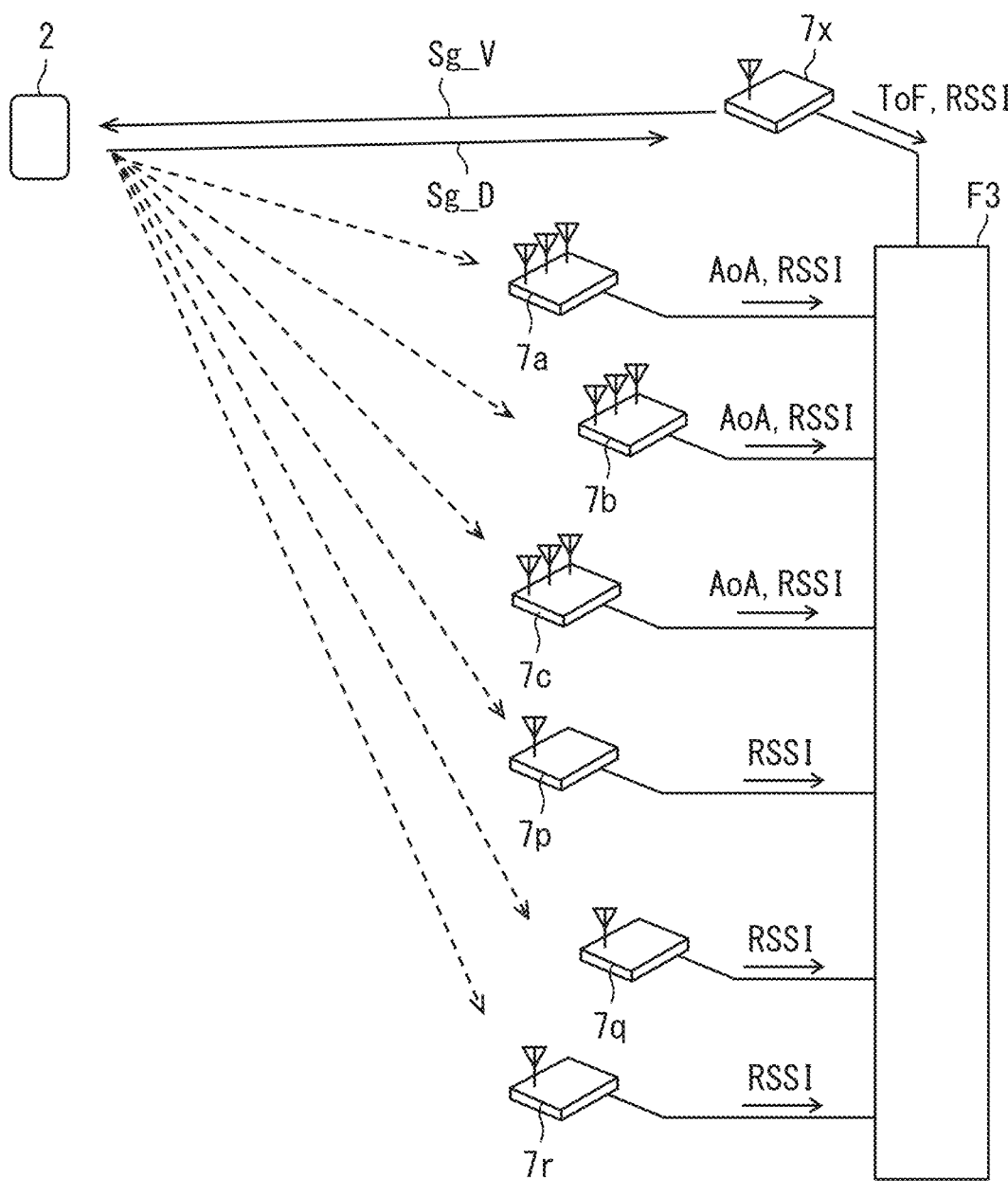
FIG. 19 is a drawing illustrating an example of a variation of an estimation premise of the device position and an observation subject thereof.

The position estimation unit F3 may combine the plurality of position estimation methods to estimate the positional coordinate of the device. For example, as illustrated in FIG. 19, the smart ECU 4 may combine the RSSI method/ToF method and the AoA method to estimate the device position. Sg_V indicated in FIG. 19 indicates the signal transmitted by the on-board system 1, the BLE communication device 7 as the specific representative device. Sg_V may be a data signal designating the portable device 2 as the destination or may be the scan request signal. Sg_V may be the CW signal.

For example, while the BLE communication devices 7a to 7c output the arrival angles (in other words, arrival directions) of the signals from the portable device 2 and the reception strengths, the BLE communication devices 7p to 7r output the reception strengths. The BLE communication device 7x performs the ranging communication and provides the ToF itself or the ToF correlation value to the processor 41. In this case, the position estimation unit F3 can combine the arrival direction observed in at least any of the BLE communication devices 7a to 7c, 7x and the reception strength observed in at least any of the BLE communication devices 7p to 7r and estimate the device position. Obviously, the distance information from the BLE communication device 7x based on the ToF correlation value may be used in combination. The BLE communication device 7 estimating the arrival direction is assumed to include a plurality of the antennae 72 as the array antennae. The BLE communication device 7 including the array antennae may analyze the reception result to calculate the arrival direction and report the arrival direction to the smart ECU 4. The respective plurality of BLE communication devices 7 may be configured to individually transmit and receive the wireless signal to/from the portable device 2 and calculate at least any one of the reception strength, the arrival direction, and the time of flight.

Besides, when the portable device 2 is present in the lock/unlock area Lx, since the closest outdoor unit can receive the direct wave from the portable device 2, the variation in the reception strength due to the difference in the frequency is small. Meanwhile, when the portable device 2 is present in the lock/unlock area Lx, the indoor unit receives the signal from the portable device 2 by diffraction or reflection by the ceiling or the like. The degree of influence to the reception strength due to the diffraction, the reflection, or the like differs depending on each of the frequency. That is, when the portable device 2 is present in the lock/unlock area Lx, the variation in the reception strength at each frequency in the indoor unit increases.

The position estimation unit F3 of the present disclosure may determine whether the portable device 2 is present inside the vehicle interior based on the degree of variation in the reception strength due to the difference in the frequency. For example, the position estimation unit F3 calculates the dispersion of the reception strength in the closest outdoor unit and the dispersion of the reception strength in the closest indoor unit based on the reception strengths at a plurality of frequencies observed in the respective closest outdoor unit and closest indoor unit. The portable device 2 may be determined to be present in the lock/unlock area Lx based on a fact that the dispersion of the reception strength in the closest outdoor unit is smaller than the dispersion of the reception strength in the closest indoor unit by a predetermined value or more. Similarly, the portable device 2 may be determined to be present inside the vehicle interior based on a fact that the dispersion of the reception strength in the predetermined indoor unit is smaller than the dispersion of the reception strength in the predetermined outdoor unit. Obviously, in addition to the dispersion of the reception strength in the outdoor unit/indoor unit, the position estimation unit F3 may perform the vehicle inside/outside determination and the lock/unlock area determination using the reception strength, the ToF, and the like together.

(Supplement of Detection Method of Transmission/Reception Phase Difference)

Figure 20:
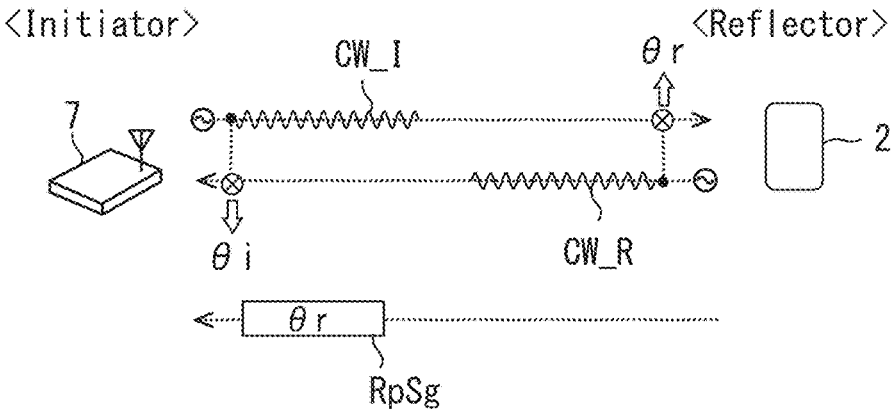
FIG. 20 is a drawing for describing a calculation principle of a transmission/reception phase difference by passive two-way method.

Examples of the detection method of the transmission/reception phase difference include an active two-way method, a passive two-way method, and a one-way method. In the active two-way method, as illustrated in FIG. 20, an initiator and a reflector mutually transmit and receive the CW signal such that each of the initiator and the reflector detects a phase difference between the transmission signal and the reception signal. The method is to identify the transmission/reception phase difference by collecting the phase difference observed in the reflector to the initiator. The initiator is a device on the side of staring communication, in other words, a device on the side of requesting a response. The reflector is a device on the side of sending back the response. Here, the BLE communication device 7 is equivalent to the initiator and the key device Kd is equivalent to the reflector. The reflector is also referred to as a responder. In the active two-way method, the portable device 2 as the reflector transmits a phase report signal indicating a phase difference (θr) observed by itself separately from the CW signal.

CW_I indicated in FIG. 20 is the CW signal transmitted by the initiator and an initial phase is indicated by δi. CW_R indicates the CW signal transmitted by the reflector and an initial phase is indicated by δr. When a phase difference to be originally observed according to the one-way distance between the initiator and the reflector is indicated by φ and a target frequency is indicated by f, θr=φ+δi−δr is met. Θi=φ−δi+δr RpSg indicated in FIG. 20 is the reception phase report signal including information on a reception phase (θr) observed by the reflector.

The initiator employs an average value of a phase angle (θi) observed by itself and a phase angle (θr) observed by the reflector as a transmission/reception phase difference (φ). Since the phase difference due to the one-way propagation is assumed here, the average values of θi and θr are treated as the transmission/reception phase difference. As another aspect, when the phase difference due to two-way propagation is assumed as the transmission/reception phase difference, the transmission/reception phase difference can be obtained by θi+θr=2φ.

The phase difference (θi, θr) observed in each device and the initial phase (δi, δr) when each device transmits the signal may be included. However, in the average value of the phase difference observed in each device, an initial phase component in each device is cancelled. With the method, even when the initial phase of the CW signal emitted from the individual device is unknown, the transmission/reception phase difference can be calculated. The portable device 2 as the reflector may individually transmit the reception phase report signals at each frequency or may collectively transmit the reception phases at a plurality of frequencies.

Figure 21:
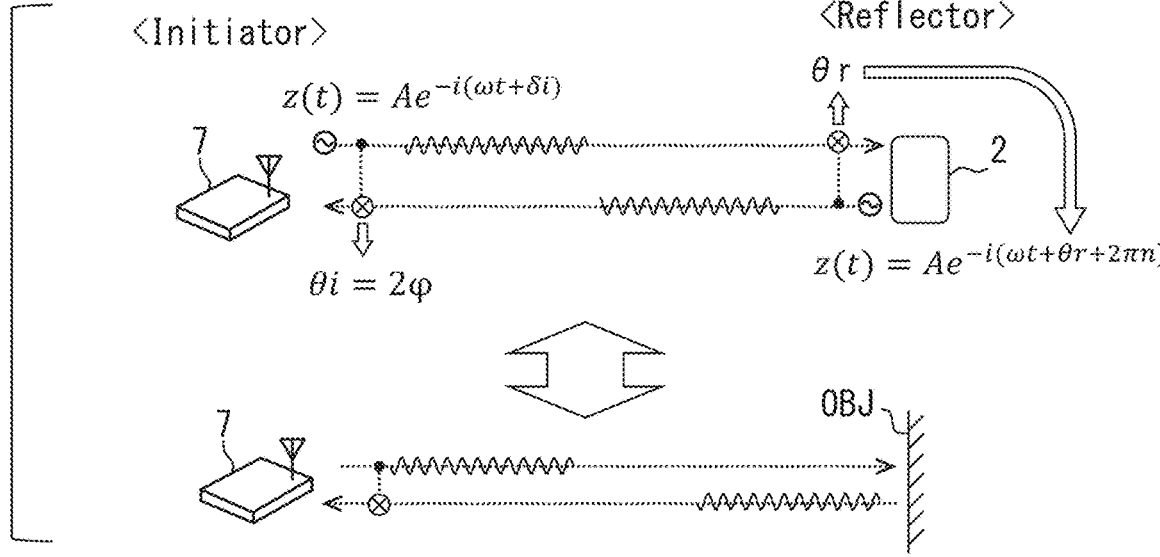
FIG. 21 is a drawing for describing a calculation principle of a transmission/reception phase difference by active two-way method.

The passive two-way method is also a method in which the initiator and the reflector mutually transmit and receive the CW signal as illustrated in FIG. 21. The difference from the active two-way method is that the reflector reflects a reception phase of the CW signal transmitted from the initiator to the initial phase of the transmission signal and transmits the transmission signal. For example, when the reception phase in the reflector is θr, the CW signal expressed by $z(t)=A \cdot \exp\{-i(\omega t+\theta r+2\pi n)\}$ is transmitted. A represents an amplitude. ω indicates an angular frequency corresponding to the target frequency (f) and has the relationship ω=2πf. n indicates a natural number and corresponds to an interval from the reception of the CW signal until the transmission of the CW signal by the reflector.

With the method as described above, the reception phase observed by the initiator becomes the same value as the case of receiving the CW signal reflected by a reflection object OBJ, such as a wall, and returned. Therefore, the reception phase becomes a value obtained by cancelling the initial phase component of the initiator. As a result, the transmission/reception phase difference can be calculated. The passive two-way method has an advantage that, compared with the active two-way method, the reflector does not need to transmit RpSg.

Figure 22:
FIG. 22 is a drawing for describing a calculation principle of the transmission/reception phase difference by one-way method.

As illustrated in FIG. 22, the one-way method is a method that premises synchronization of an initial phase/local oscillator between the devices and directly employs the reception phase of the CW signal transmitted from the portable device 2 directly as the transmission/reception phase difference. The synchronization of the initial phase/local oscillator between the devices may be achieved by, for example, transmitting a predetermined synchronization signal. The method of identifying the transmission/reception phase difference is not limited to the method, and various methods can be employed. The portable device 2 may be configured to operate so as to correspond to the method employed by the system.

(Supplement of Measurement Method of ToF Correlation Value by Sniffing Method)

The device distance using the RTT/ToF may be estimated by employing the method described in JP 2020-85487 A. That is, not the plurality of BLE communication devices 7 individually communicating with the portable device 2, but the distance from the observation device to the portable device 2 may be calculated by the sniffing method. For example, the BLE communication device 7x as the representative device measures the RTT from the transmission of the response request signal until the reception of the response signal from the portable device 2 and reports the RTT to the smart ECU 4. The observation device as the BLE communication device 7 other than the representative device measures a reception interval from the reception of the response request signal emitted from the representative device until reception of the response signal emitted from the portable device 2 and reports the reception interval to the smart ECU 4. The smart ECU 4 identifies a first time of flight as a time of flight of a signal between the portable device and the representative device based on the RTT. The smart ECU 4 identifies a second time of flight as a time of flight of a signal between the portable device and the observation device based on the reception interval in the observation device and the first Time of Flight. Each of the first time of flight and the second time of flight is equivalent to the ToF.

The on-board system 1 may be configured to calculate the transmission/reception phase difference and eventually the two-frequency phase difference as a distance index from the observation device to the portable device 2 by the sniffing method. The transmission/reception phase difference as the distance index from a certain observation device to the portable device 2 can be identified by combination of the observation value in the observation device and the observation value in the representative device. The observation value in the observation device means, for example, the reception phase of the CW signal detected in the observation device and emitted from the BLE communication device 7x as the representative device and the reception phase of the CW signal emitted from the portable device 2. The observation value in the representative device means the transmission/reception phase difference obtained by the representative device transmitting and receiving the CW signal to/from the portable device 2.

Thus, the configuration that identifies the transmission/reception phase difference in the observation device by the sniffing allows acquiring the transmission/reception phase difference of the plurality of observation devices in parallel when the representative device performs the communication for ranging with the portable device 2. Accordingly, the device position can be identified quicker than the above-described embodiment. Obviously, not the processor 41 but each of the observation devices may calculate the ToF correlation value for each of the observation devices. Each of the observation devices may sniff the signals from another BLE communication device 7 and the portable device 2 to detect the ToF correlation value and the reception strength and output the detection result to the processor 41.

(Supplement of Entire Ranging Process)

The transmission/reception phase difference and the reception strength may be each extracted from the identical reception signal or may be extracted from respective different signals. The operation of the entire system mainly includes three patterns. A first pattern as the first pattern is a pattern in which the plurality of BLE communication devices 7 individually perform the bidirectional communication with the portable device 2 to collect the ToF correlation value and the reception strength for each of the BLE communication devices 7. A second pattern as the second pattern is a pattern in which the portable device 2 and the representative device perform the bidirectional communication and also the plurality of observation devices sniff the communication signal between the portable device 2 and the representative device to collect the ToF correlation value and the reception strength. The second pattern corresponds to a pattern of utilizing the sniffing method in the two-way method.

A third pattern as the third pattern is a pattern in which the representative device performs the bidirectional communication with the portable device 2 to perform a time synchronization process and then the representative device and the observation device perform ranging based on the signal from the portable device 2 by the one-way method. In this case, the representative device can share time information synchronized with the portable device 2 with each of the observation devices through the in-vehicle network Nw. In the third pattern, not only the representative device but also the portable device 2 and each of the observation devices may perform the bidirectional communication to individually perform the time synchronization. For the ranging in the one-way method, each of the observation devices may sniff the signal during the bidirectional communication between the representative device and the portable device 2 to perform the time synchronization with the portable device 2. The wireless signal as the sniffing target can be identified with the reference information delivered from the representative device as described above. The third pattern may utilize the sniffing or need not utilize the sniffing.

The smart ECU 4 may perform only any one of the plurality of patterns or may be able to perform the plurality of patterns. When the smart ECU 4 is configured to ensure performing the plurality of patterns, which of the first to third patterns is employed may be manually or automatically selected according to performance/specification of the portable device 2 or the BLE communication device 7.

(Start Control of Smart Key Using LF)

As described above, the portable device 2 may be the smart key. However, the smart key is highly possibly configured to be operated with a primary cell and further power saving is required. Due to the circumstance, the smart key as the portable device 2 is preferably basically configured to maintain a sleep state during which the BLE communication cannot be performed. When the smart key receives a predetermined wake signal achieved using the radio wave in the LF band or a predetermined button is pressed by the user, the sleep mode temporarily transitions to an active mode during which the BLE communication can be performed.

Figure 23:
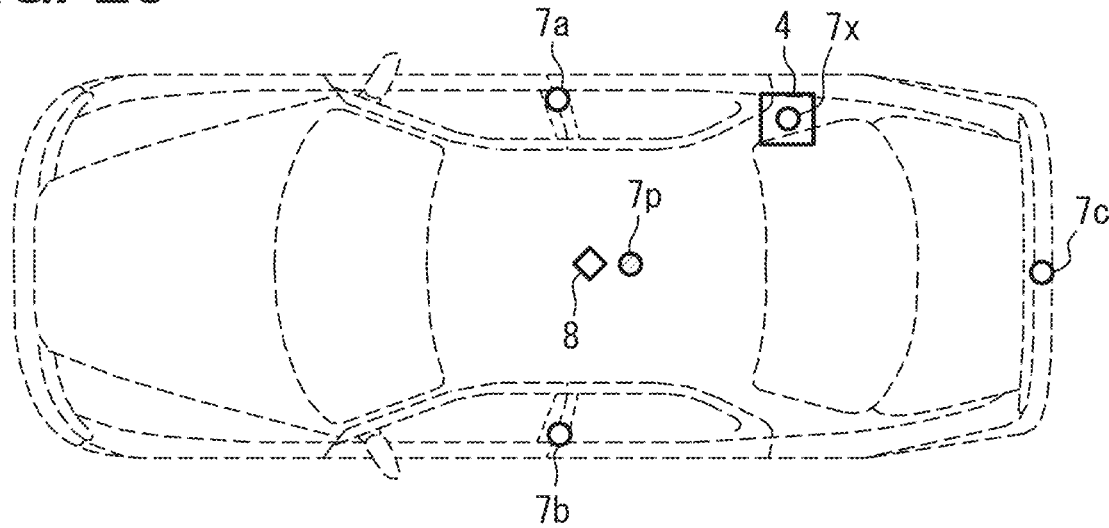
FIG. 23 is a drawing illustrating an example of a configuration of an on-board system 1 that allows transmitting a wake signal.

In view of the configuration of the smart key as described above, the on-board system 1 also requires a facility to transmit the wake signal in the LF band. For example, as illustrated in FIG. 23, in the on-board system 1, an LF transmission device 8 to transmit the wake signal may be disposed on to any position inside the vehicle. The LF transmission device 8 is a device that transmits a signal at a predetermined frequency belonging to the LF band based on a command from the smart ECU 4. The LF band here means from 30 kHz to 300 kHz. The LF transmission device 8 is configured using an LF transmission circuit and an antenna. The LF transmission circuit is a circuit that performs predetermined signal processing, such as digital-analog conversion, frequency conversion, and modulation. The LF transmission circuit may be included in the smart ECU 4.

The LF transmission device 8 is, for example, disposed at the center portion of the instrument panel in the vehicle width direction and in the vicinity of a center console box. The LF transmission device 8 may be disposed on the overhead console and the ceiling inside the vehicle. The LF transmission device 8 may be buried in a seating surface of the rear seat or may be disposed inside the trunk. A plurality of LF transmission devices 8 may be disposed. Installation positions and the number of the LF transmission devices 8 are appropriately changeable. Transmission electric power and a mounting position of the LF transmission device 8 are set such that an area within 5 m from the vehicle Hv including inside the vehicle interior becomes an effective communication area. The effective communication area means a range in which the wake signal propagates with the predetermined strength maintained.

The configuration allows suppressing the power consumption in the smart key. The authentication of the device itself is performed in the BLE communication even when the communication destination is the smart key. Since a facility for the smart key disposed in the vehicle Hv is only the LF transmission device 8, the system introduction cost can be reduced.

(Communication Method Usable for Position Estimation of Portable Device 2)

The communication method for data communication between the on-board system 1 and the portable device 2 and the communication method used to identify the device position may differ. For example, while the data communication between the on-board system 1 and the portable device 2 uses the BLE communication, UWB communication may be used to identify the device position. The UWB communication means communication in an ultra wide band-impulse radio (UWB-IR) method. Hereinafter, the system configuration that uses the UWB communication to estimate the position of the terminal is referred to as a configuration in combination use with the UWB.

Figure 24:
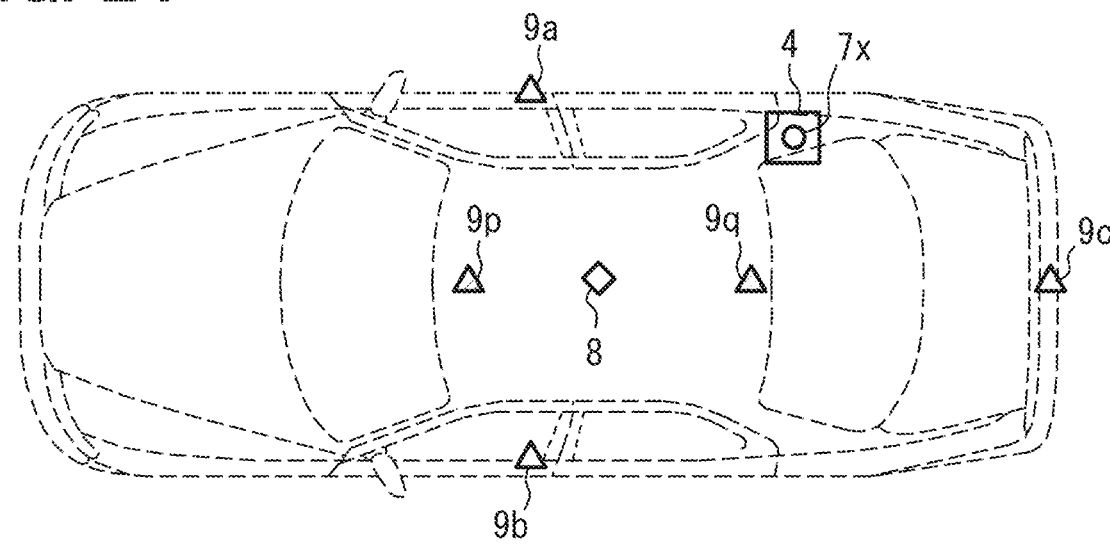
FIG. 24 is a drawing illustrating a system configuration example that estimates a position the portable device using a UWB communication device.

In the configuration in combination use with the UWB, the portable device and the smart key that may be the portable device 2 includes a circuit module to transmit and receive an impulse-shaped radio wave (hereinafter, an impulse signal) used in the UWB communication in addition to the BLE communication unit. The on-board system 1, for example, as illustrated in FIG. 24, includes a plurality of UWB communication devices 9. The UWB communication device 9 is a communication module to receive the impulse signal used in the UWB communication. The impulse signal used in the UWB communication is a signal having a pulse width of an extremely short time, such as 2 nanoseconds. The UWB communication is also referred to as ultra-wideband communication. The frequency usable for the UWB communication is, for example, 2.1 GHz to 10.6 GHz, 2.4 GHz to 4.8 GHz, and 22 GHz to 29 GHz.

The on-board system 1, for example, as illustrated in FIG. 24, includes UWB communication devices 9a to 9c and 9p to 9q. The UWB communication device 9a is disposed on the outer surface of the pillar B in the right side door. The UWB communication device 9b is disposed on the outer surface of the pillar B in the left side door. The UWB communication device 9c is disposed on the center portion of the rear bumper in the right-left direction. The UWB communication devices 9a to 9c are equivalent to the outdoor units as the UWB communication devices 9 disposed on the outer surfaces of the vehicle. The UWB communication device 9p is, for example, disposed at a position on the front side by a predetermined distance from the center portion of the indoor ceiling portion. The UWB communication device 9p is, for example, disposed at a position on the rear side by a predetermined distance from the center portion of the indoor ceiling portion.

The position estimation unit F3 causes each of the plurality of UWB communication devices 9 to transmit and receive the impulse signal to/from the portable device 2 in a predetermined sequence to estimate the distance from each of the UWB communication devices 9 to the portable device 2. To estimate the distance, for example, the ToF method can be employed. The position of the portable device 2 is estimated based on the distance information from each of the UWB communication devices 9 to the portable device 2 and mounting location information of each of the UWB communication devices 9 indicated in the communication device setting data. Thus, the use of the UWB communication device 9 instead of the BLE communication device 7 also allows estimating the device position. That is, the BLE communication device 7 in this specification can be embodied by being replaced by the UWB communication device 9.

ADDITIONAL NOTES

The device, the system, and the method thereof described in the present disclosure may be implemented by a dedicated computer that is configured by a processor programmed to execute one or more functions by executing a computer program. The device, the system, and the method thereof described in the present disclosure may also be implemented using dedicated hardware logic circuitry. The device, the system, and the method thereof described in the present disclosure may be implemented by one or more dedicated computers configured by a combination of a processor that executes a computer program and one or more hardware logic circuitries. For example, partial or entire of the functions of the smart ECU 4 may be implemented by hardware circuitry. A configuration in which certain function is implemented by hardware logic circuitry includes a configuration in which the function is implemented using one or more ICs or the like. As the processor (arithmetic core), a CPU, an MPU, a GPU, a DFP (Data Flow Processor), or the like can be adopted. Partial or entire of the functions of the smart ECU 4 may be implemented by combining multiple types of arithmetic processing devices. Partial or entire of the functions of the smart ECU 4 may be implemented using a system-on-chip (SoC), an FPGA, an ASIC, or the like. FPGA is an abbreviation for Field-Programmable Gate Array. ASIC is an abbreviation for Application Specific Integrated Circuit. The computer program described above may be stored in a computer-readable non-transitory tangible storage medium as instructions to be executed by a computer. As a storage medium for storing the computer program, a hard disk drive (HDD), a solid state drive (SSD), a flash memory, or the like can be adopted.

What is claimed is:

1. A position determination system for a vehicle, the position determination system performing wireless communication with a portable device carried by a user of the vehicle to determine a position of the portable device with respect to the vehicle, the position determination system comprising:

a plurality of outdoor units each of which is configured by a communication device that allow the wireless communication with the portable device, each of the plurality of outdoor units being installed at a position on an outer surface portion of the vehicle different from one another;

at least one indoor unit configured by a communication device installed inside a vehicle interior of the vehicle;

a communication control unit controlling operations of the plurality of outdoor units and the at least one indoor unit; and a position estimation unit determining whether the portable device is present inside the vehicle interior and whether the portable device is present in an outdoor operation area, the outdoor operation area being defined as an area outside the vehicle interior within a predetermined distance from the vehicle, wherein the communication control unit:

acquires a reception strength of a signal from the portable device in each of the communication devices; and acquires a time of flight (ToF) correlation value as a parameter different from the reception strength, the ToF correlation value directly or indirectly indicating time of flight of a radio wave from at least one of the plurality of outdoor units to the portable device, and the position estimation unit:

changes a type of the parameter used for position determination corresponding to an area for which the position determination is to be performed;

determines whether the portable device is present inside the vehicle interior based on the reception strength observed in each of the plurality of outdoor units and the reception strength observed in the at least one indoor unit; and determines whether the portable device is present in the outdoor operation area based on the ToF correlation value.

2. The position determination system according to claim 1, wherein the communication control unit causes a predetermined basic representative device, which is one of the communication devices, to perform transceiving of a predetermined signal for ranging with the portable device to acquire the ToF correlation value corresponding to the basic representative device, and the position estimation unit determines that the portable device is present in the outdoor operation area when a distance from the basic representative device to the portable device determined based on the ToF correlation value corresponding to the basic representative device is less than a predetermined value.

3. The position determination system according to claim 1, wherein the communication control unit causes each of the plurality of outdoor units to perform transceiving of a predetermined signal for ranging with the portable device in sequence to acquire the ToF correlation value corresponding to each of the plurality of outdoor units, and the position estimation unit determines whether the portable device is present in the outdoor operation area based on the ToF correlation value corresponding to each of the plurality of outdoor units.

4. The position determination system according to claim 1, wherein the communication control unit:

identifies, among the plurality of outdoor units, a closest outdoor unit that is closest to the portable device based on the reception strength observed in each of the plurality of outdoor units; and causes the closest outdoor unit to perform transceiving of a predetermined signal for ranging with the portable device to acquire the ToF correlation value corresponding to the closest outdoor unit, and the position estimation unit determines whether the portable device is present in the outdoor operation area based on the ToF correlation value corresponding to the closest outdoor unit.

5. The position determination system according to claim 1, wherein the communication control unit:

identifies, among the plurality of outdoor units, a closest outdoor unit that is closest to the portable device based on a device direction, the device direction indicating a direction where the portable device is present and is determined by analyzing a reception signal from the portable device; and causes the closest outdoor unit to perform transceiving of a predetermined signal for ranging with the portable device to acquire the ToF correlation value corresponding to the closest outdoor unit, and the position estimation unit determines whether the portable device is present in the outdoor operation area based on the ToF correlation value corresponding to the closest outdoor unit.

6. The position determination system according to claim 1, wherein the communication control unit:

causes a predetermined basic representative device, which is one of the communication devices, to perform transceiving of a predetermined signal for ranging with the portable device to acquire the ToF correlation value corresponding to the basic representative device; and acquires the ToF correlation value corresponding to at least one of the plurality of outdoor units by causing the at least one of the plurality of outdoor units to perform transceiving of a predetermined signal with the portable device in response to a distance from the basic representative device to the portable device, which is determined based on the ToF correlation value corresponding to the basic representative device, being less than a predetermined primary threshold value, a predetermined secondary threshold value is set to be smaller than the predetermined primary threshold value, and the position estimation unit determines that the portable device is present in the outdoor operation area in response to determining that the distance from the at least one of the plurality of outdoor units to the portable device, which is determined based on the ToF correlation value corresponding to the at least one of the plurality of outdoor units, is less than the predetermined secondary threshold value.

7. The position determination system according to claim 1, further comprising a plurality of indoor units as the at least one indoor unit; and a predetermined storage device storing communication device setting data indicating a mounting position of each of the communication devices with respect to the vehicle, wherein the position estimation unit:

identifies, among the plurality of outdoor units, a closest outdoor unit that is closest to the portable device based on a reception situation of a signal from the portable device in each the plurality of outdoor units; and identifies, among the plurality of indoor units, a closest indoor unit that is closest to the closest outdoor unit based on a mounting position of each of the communication devices indicated by the communication device setting data, and the position estimation unit determines whether the portable device is present inside the vehicle interior based on a difference between the reception strength in the closest indoor unit and the reception strength in the closest outdoor unit.

8. The position determination system according to claim 1, wherein the communication control unit causes the at least one indoor unit to perform transceiving of a predetermined signal for ranging with the portable device to acquire the ToF correlation value corresponding to the at least one indoor unit, and the position estimation unit determines absence of the portable device inside the vehicle interior when a distance from the at least one indoor unit to the portable device determined based on the ToF correlation value is equal to or more than a predetermined value.

9. The position determination system according to claim 1, wherein the wireless communication with the portable device is performed at multiple frequencies different from one another, the communication control unit collects, for each of the communication devices, the reception strength at each of the multiple frequencies, and the position estimation unit determines whether the portable device is present inside the vehicle interior based on an average value or a dispersion of the reception strengths at the multiple frequencies in each of the communication devices.

10. The position determination system according to claim 1, wherein the communication control unit sets one of the communication devices as a representative device to perform bidirectional communication with the portable device, the communication control unit sets each of remaining communication devices as an observation device to perform signal reception without performing signal transmission, and the communication control unit acquires the reception strength from both of the representative device and the observation device.

11. The position determination system according to claim 1, wherein the plurality of outdoor units includes at least four outdoor units, one of the at least four outdoor units is disposed on a front end portion of the vehicle, the communication control unit acquires the ToF correlation value for each of the at least four outdoor units, the position estimation unit identifies a distance from each of the at least four outdoor units to the portable device based on the corresponding ToF correlation value, and the position estimation unit determines presence of the portable device in a remote parking area, which is an area for remote parking purpose and corresponds to the outdoor operation area, in response to determining that the distance from one of the at least four outdoor units to the portable device is equal to or less than a predetermined value.

12. The position determination system according to claim 1, wherein the communication control unit changes a transmission electric power in each of the communication devices or a communication rate with the portable device based on a distance from the vehicle to the portable device.

13. The position determination system according to claim 1, wherein the position estimation unit automatically switches an algorithm to determine a position of the portable device according to a mounting pattern of the communication devices with respect to the vehicle, and the mounting pattern of the communication devices is identified by referring to communication device setting data that indicates a mounting position of each of the communication devices with respective to the vehicle.

14. The position determination system according to claim 1, wherein the ToF correlation value is a round-trip time, which is a time from transmission of a response request signal to reception of a response signal, or a transmission reception phase difference at each frequency, which is obtained by transmitting and receiving continuous wave signals at respective different frequencies.

15. A position determination method executed by at least one processor to determine a position of a portable device carried by a user of a vehicle, the position determination method comprising:

acquiring, from each of a plurality of outdoor units, data indicating a reception strength of a signal transmitted from the portable device, the plurality of outdoor units being disposed at respective different positions on an outer surface portion of the vehicle, each of the plurality of outdoor units being configured by a communication device that performs a wireless communication with the portable device;

acquiring, from at least one indoor unit, data indicating the reception strength of the signal transmitted from the portable device, the at least one indoor unit being configured by a communication device disposed inside a vehicle interior of the vehicle;

determining whether the portable device is present inside the vehicle interior based on the reception strength observed in each of the plurality of outdoor units and the reception strength observed in the at least one indoor unit;

acquiring a time of flight (ToF) correlation value as a parameter different from the reception strength, the ToF correlation value directly or indirectly indicating time of flight of a radio wave from at least one of the plurality of outdoor units to the portable device;

changing a type of the parameter used for position determination corresponding to an area for which the position determination is to be performed; and determining whether the portable device is present in an outdoor operation area based on the ToF correlation value, the outdoor operation area being defined as an area outside the vehicle interior within a predetermined distance from the vehicle.

16. A position determination system for a vehicle, the position determination system performing wireless communication with a portable device carried by a user of the vehicle to determine a position of the portable device with respect to the vehicle, the position determination system comprising:

a plurality of outdoor units each of which is configured by a communication device that allow the wireless communication with the portable device, each of the plurality of outdoor units being installed at a position on an outer surface portion of the vehicle different from one another;

at least one indoor unit configured by a communication device installed inside a vehicle interior of the vehicle;

a computer-readable non-transitory storage medium; and a microcomputer, by executing a program stored in the computer-readable non-transitory storage, configured to:

control operations of the plurality of outdoor units and the at least one indoor unit;

determine whether the portable device is present inside the vehicle interior and whether the portable device is present in an outdoor operation area, the outdoor operation area being defined as an area outside the vehicle interior within a predetermined distance from the vehicle;

acquire a reception strength of a signal from the portable device in each of the communication devices;

acquire a time of flight (ToF) correlation value as a parameter different from the reception strength, the ToF correlation value directly or indirectly indicating time of flight of a radio wave from at least one of the plurality of outdoor units to the portable device;

change a type of the parameter used for position determination corresponding to an area for which the position determination is to be performed;

determine whether the portable device is present inside the vehicle interior based on the reception strength observed in each of the plurality of outdoor units and the reception strength observed in the at least one indoor unit; and determine whether the portable device is present in the outdoor operation area based on the ToF correlation value.

\* \* \* \* \*